(12) United States Patent
Gupta et al.

(10) Patent No.: US 9,374,678 B2
(45) Date of Patent: Jun. 21, 2016

(54) KALMAN FILTER ITERATIVELY PERFORMING TIME/MEASUREMENT UPDATE OF USER/RELATIVE FLOOR LOCATIONS

(71) Applicant: TEXAS INSTRUMENTS INCORPORATED, Dallas, TX (US)

(72) Inventors: Pankaj Gupta, Dausa (IN); Sthanunathan Ramakrishnan, Bangalore (IN); Jaiganesh Balakrishnan, Bangalore (IN); Sachin Bhardwaj, Bangalore (IN)

(73) Assignee: Texas Instruments Incorporated, Dallas, TX (US)

(*) Notice: Subject to any disclaimer, the term of this patent is extended or adjusted under 35 U.S.C. 154(b) by 61 days.

(21) Appl. No.: 14/194,449

(22) Filed: Feb. 28, 2014

(65) Prior Publication Data

US 2015/0249907 A1 Sep. 3, 2015

(51) Int. Cl.
*H04W 4/04* (2009.01)

(52) U.S. Cl.
CPC ...................................... *H04W 4/043* (2013.01)

(58) Field of Classification Search
USPC ................. 455/456, 456.2; 370/252; 342/450
See application file for complete search history.

(56) References Cited

U.S. PATENT DOCUMENTS

| | | | |
|---|---|---|---|
| 2003/0129992 A1 | 7/2003 | Koorapaty et al. | |
| 2005/0176406 A1 | 8/2005 | Krishnakumar et al. | |
| 2006/0019679 A1 | 1/2006 | Rappaport et al. | |
| 2009/0067392 A1 | 3/2009 | Hart et al. | |
| 2009/0286548 A1* | 11/2009 | Coronel et al. | ............ 455/456.1 |
| 2011/0256894 A1* | 10/2011 | Khandelia | ......... H04W 36/0083 455/507 |
| 2011/0287801 A1* | 11/2011 | Levin et al. | .................... 455/517 |
| 2012/0072110 A1 | 3/2012 | Venkatraman | |
| 2012/0195215 A1* | 8/2012 | Jeong | ............................. 370/252 |
| 2014/0274116 A1* | 9/2014 | Xu | ........................... G01S 11/06 455/456.1 |
| 2014/0335893 A1* | 11/2014 | Ronen | ......................... 455/456.1 |

FOREIGN PATENT DOCUMENTS

| | | |
|---|---|---|
| CN | 103581929 A | 2/2014 |
| WO | 2013156934 A1 | 10/2013 |

* cited by examiner

*Primary Examiner* — Marisol Figueroa
(74) *Attorney, Agent, or Firm* — Lawrence J. Bassuk; Frank D. Cimino

(57) ABSTRACT

Several systems and methods for location estimation in a multi-floor environment are disclosed. In an embodiment, the method includes performing wireless scanning so as to receive wireless signals from one or more access points from among a plurality of access points positioned at plurality of locations, respectively at one or more floors from among a plurality of floors within the multi-floor environment. A first set of RSSI measurements is computed corresponding to the wireless signals. Absolute floor location information is determined based on the first set of RSSI measurements and a pre-defined objective function. The pre-defined objective function is configured to maximize a probability of a user being located at a floor so as to receive the wireless signals. A user floor location is determined based on the absolute floor location information. The user location is estimated at least in part based on the user floor location.

14 Claims, 11 Drawing Sheets

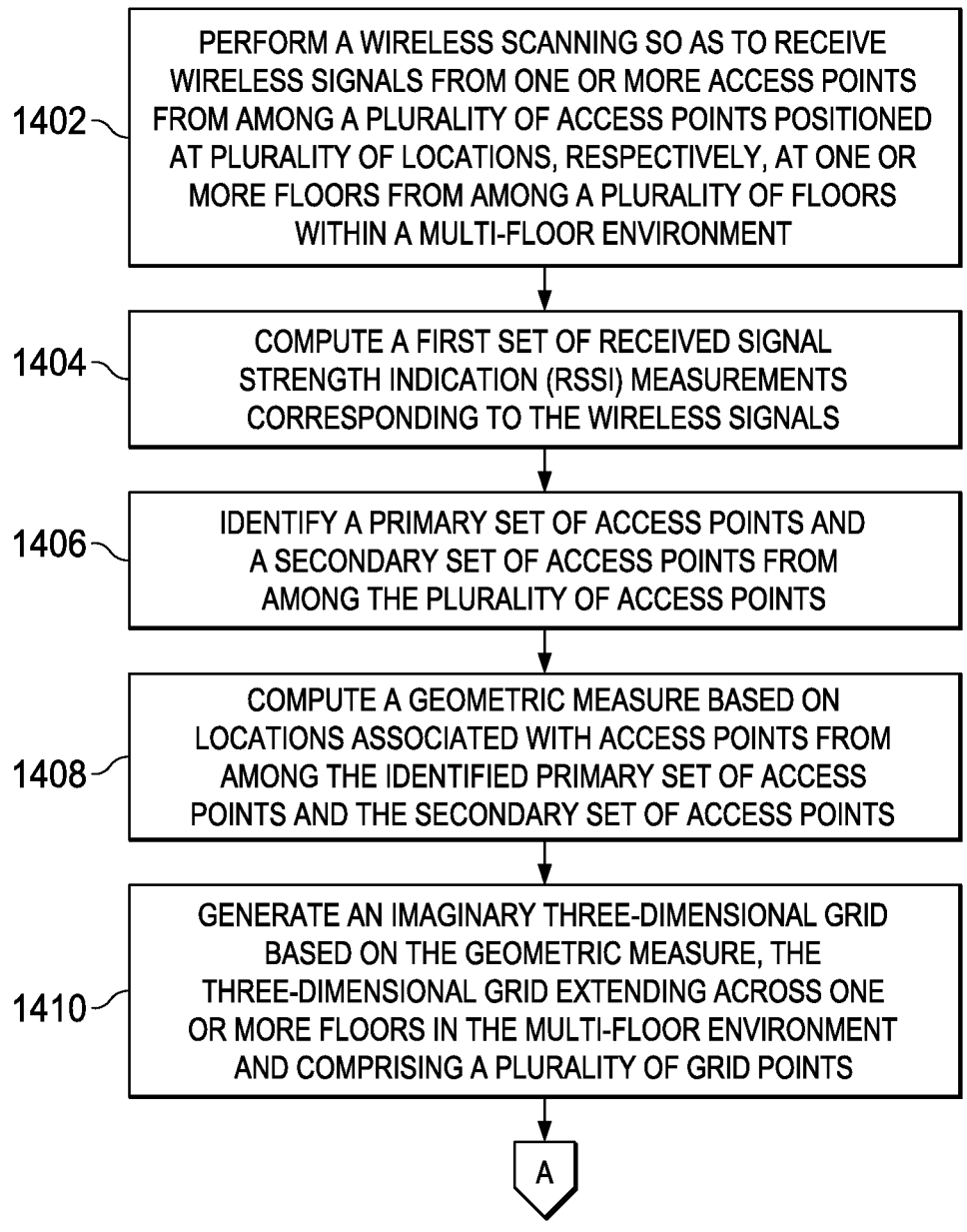

KALMAN FILTER ITERATIVELY PERFORMING TIME/MEASUREMENT UPDATE OF USER/RELATIVE FLOOR LOCATIONS

TECHNICAL FIELD

The present disclosure generally relates to the field of location estimation.

BACKGROUND

In recent times, indoor positioning techniques within location estimation technologies have become very popular due to their immense and varied applications, such as indoor navigation, search and rescue, asset tracking, health care, mobile advertising and the like. In accordance with an example scenario, satellite-based navigation system (or Global Navigation Satellite System (GNSS)) is the most widely used technology for location estimation. However, GNSS may be highly unreliable in indoor environments due to poor satellite visibility and multipath related issues. Moreover, such a navigation system may be configured to provide two-dimensional (2D) positioning information only. However, in indoor environments such as in multi-floor buildings, it may not always be sufficient to simply give user position in two dimensions; rather, providing the floor information upon which the user is currently navigating may also be important. For example, in applications like search and rescue, floor estimation accuracy is more important than 2D positioning accuracy. Accordingly, floor determination is an important feature of a comprehensive three-dimensional indoor positioning solution.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Various systems and methods for location estimation in a multi-floor environment are disclosed. In an embodiment, the method includes performing a wireless scanning so as to receive wireless signals from one or more access points from among a plurality of access points positioned at plurality of locations, respectively, at one or more floors from among a plurality of floors within a multi-floor environment. A first set of received signal strength indication (RSSI) measurements corresponding to the wireless signals is computed. Absolute floor location information in the multi-floor environment is determined based on the first set of RSSI measurements and a pre-defined objective function. The pre-defined objective function is configured to maximize a probability of a user being located at a floor from among the plurality of floors so as to receive the wireless signals corresponding to the first set of RSSI measurements. The probability is estimated based on a three-dimensional channel model comprising a plurality of channel model parameters. The method further includes determining a user floor location based on the absolute floor location information. Furthermore, the method includes estimating the user location in the multi-floor environment based at least in part on the user floor location.

In an embodiment, a location estimation system is provided. The location estimation system includes a transceiver module and a location estimation module communicatively associated with the transceiver module. The transceiver module is configured to perform a wireless scanning so as to receive wireless signals from one or more access points from among a plurality of access points positioned at plurality of locations, respectively, at one or more floors from among a plurality of floors within a multi-floor environment. The location estimation module is configured to compute a first set of received signal strength indication (RSSI) measurements corresponding to the wireless signals. The location estimation module is further configured to determine absolute floor location information in the multi-floor environment based on the first set of RSSI measurements and a pre-defined objective function. The pre-defined objective function is configured to maximize a probability of a user being located at a floor from among the plurality of floors so as to receive the wireless signals corresponding to the first set of RSSI measurements. The probability is estimated based on a three-dimensional channel model comprising a plurality of channel model parameters. The location estimation module is configured to determine a user floor location based on the absolute floor location information. The location estimation module is also configured to estimate the user location in the multi-floor environment based at least in part on the user floor location.

In an embodiment, the location estimation module is further configured to determine relative floor location information based on pressure sensor measurements corresponding to user movements in the multi-floor environment. The relative floor location information comprises a relative floor location estimate and a second uncertainty estimate associated with the relative floor location estimate. The relative user floor location estimate is computed by comparing a change in altitude associated with the user movements to a relative floor height value. In an embodiment, the user floor location is determined along with a third uncertainty estimate by optimally weighing the absolute floor location estimate and the relative floor location estimate based on the first uncertainty estimate and the second uncertainty estimate.

In an embodiment, the location estimation module is further configured to detect a presence of step movements associated with the user movements based on accelerometer measurements received from an accelerometer. The location estimation module is also configured to determine a vertical motion indication and a vertical velocity information based on the pressure sensor measurements. The location estimation module is further configured to compute a context of the user location based on the step movements detection and the determined vertical motion indication and the vertical velocity information, where the context of the user location is one of a staircase context, an elevator context, an escalator context and an on-floor context.

Additionally, in an embodiment, another location estimation system is provided. The location estimation system includes a transceiver module and a location estimation module communicatively associated with the transceiver module. The transceiver module is configured to receive a user floor location and associated floor location uncertainty estimate within a multi-floor environment. The location estimation module is configured to generate an imaginary two-dimensional grid across the user floor location. The location estimation module is configured to compute a two-dimensional location estimate within the user floor location along with associated uncertainty measure based on RSSI measurements corresponding to wireless signals received from at least one of access points positioned in the user floor location and access points positioned in floors other than the user floor location. The two-dimensional location estimate is computed based on MMSE algorithm configured to compute weighted probabilities of a user being located at various positions in the imaginary two-dimensional grid based on RSSI information from access points positioned in the user floor location and access points positioned in floors other than the user floor location.

Other aspects and example embodiments are provided in the drawings and the detailed description that follows.

BRIEF DESCRIPTION OF THE FIGURES

FIGS. 14A, 14B and 14C illustrate a flow diagram of a second example location estimation method in accordance with an example embodiment.

The drawings referred to in this description are not to be understood as being drawn to scale except if specifically noted, and such drawings are only exemplary in nature.

DETAILED DESCRIPTION

Pursuant to an example scenario, satellite based navigation system (or Global Navigation Satellite System (GNSS)) is the most widely used technology for location estimation. However, GNSS may be highly unreliable in indoor environments due to poor satellite visibility and multipath related issues. Moreover, such a navigation system may be configured to provide two-dimensional (2D) positioning information only since the information along the third dimension may be highly unreliable for positioning applications. However, in indoor environments such as in multi-floor buildings, it may not always be sufficient to simply give user position in two dimensions; rather, providing the floor information upon which the user is currently navigating may also be important. For example, in applications like search and rescue, floor estimation accuracy is more important than 2D positioning accuracy. Accordingly, floor determination is an important feature of a comprehensive three-dimensional indoor positioning solution. An example multi-floor environment is explained with reference to FIG. 1.

Figure 1:
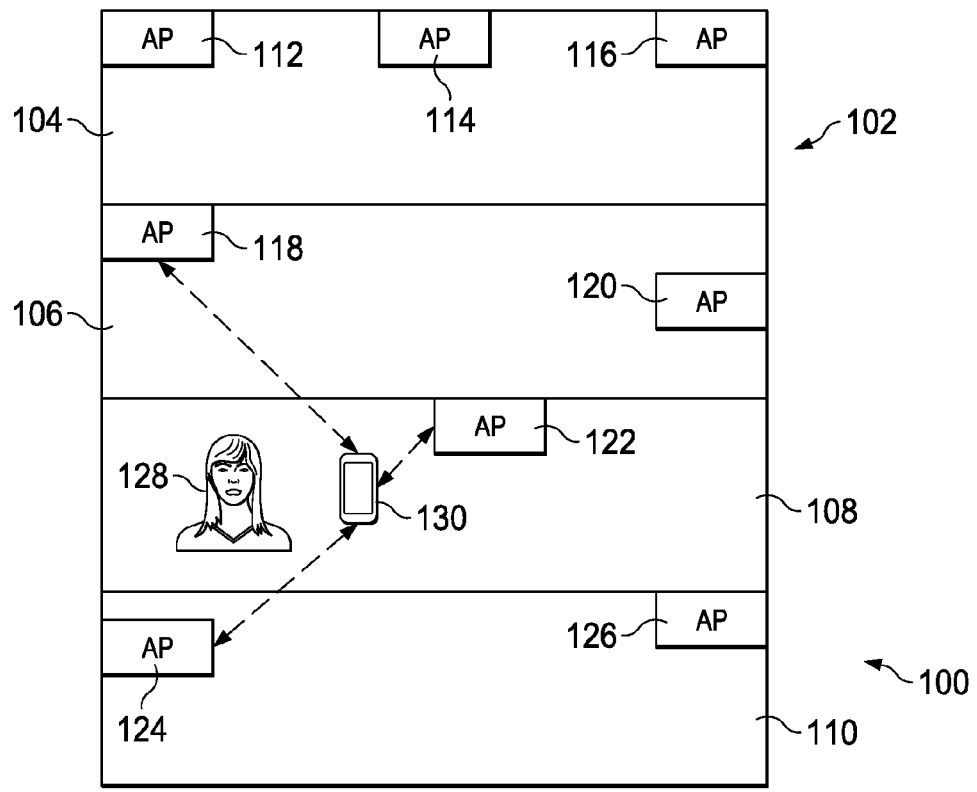
FIG. 1 depicts a first example multi-floor environment in accordance with an example scenario.

FIG. 1 depicts a first example multi-floor environment 100 in accordance with an example scenario. The multi-floor environment 100 includes a building 102. The building 102 includes a plurality of floors, such as floor 104, floor 106, floor 108 and floor 110. It is noted that the building 102 is depicted herein as an example of the multi-floor environment 100 and that the multi-floor environment 100 may not be limited to such building structures alone, but, instead may include any such multi-storied structures. Further it is noted that a number of floors in the building 102 is depicted to be four for example purposes and that the building 102 may include fewer or more floors. The floors 104-110 are hereinafter referred to as plurality of floors.

The building 102 is further depicted to include a plurality of access points (depicted as "AP" in FIG. 1) for provisioning wireless access to users in the building 102. The wireless access provisioning may conform to wireless local area network (WLAN) specifications, such as Institute of Electrical and Electronic Engineers (IEEE) ratified 802.11 specifications (or Wi-Fi specifications). It is noted that wireless access provisioning may not be limited to wireless access points and WLAN standards as explained herein, and such provisioning may be extended to other forms of wireless access, such as those utilizing near field communication (NFC) terminals, Bluetooth interfaces and Zigbee networks. The plurality of access points are distributed across the plurality of floors, such that each floor includes one or more access points from among the plurality of access points. For example, the floor 104 includes access points 112, 114 and 116; the floor 106 includes access points 118 and 120; floor 108 includes access point 122 and floor 110 includes access points 124 and 126. The access points 112-126 together configure the plurality of access points. It is noted that each floor may include fewer or more number of access points than that depicted in FIG. 1. Further, a positioning of the access points within each floor is depicted for exemplary purposes and positioning of various access points may be configured to provide optimum signal strength wireless signals to users in their vicinity.

An example user 128 is depicted to be positioned at floor 108. The user 128 is associated with a user device 130 configured to communicate with one or more access points from among the plurality of access points. Examples of user device 130 may include electronic devices, such as a cellular phone, a Smartphone, a laptop, a tablet personal computer and the like. The communication between the user device 130 and one or more access points, such as access points 118, 122 and 124 is depicted by dotted arrows in FIG. 1. The user 128 may wirelessly communicate with the one or more access points for information exchange. The strength of the received signals may be utilized to determine a distance of the user 128 from the corresponding access point. Using one or more such distance computations, a three-dimensional (3D) location of the user 128 is determined. Such computations for determining the 3D location of the user 128 make a number of assumptions for the said determination. For example, a floor location computation involves a maximum access point visibility across floors criterion (where an access point visibility for $i^{th}$ floor is computed as a percentage value of a number of access points visible on the floor from among the total number of access points on $i^{th}$ floor). Such a computation assumes that access points are uniformly placed on each floor, which is not the case generally in the indoor environments. Moreover, such computations assume a number of access points is same on each floor (i.e. uniform density of access points), which may not be the case as seen in FIG. 1. Moreover, such computations assume that all access points are always switched ON. The said computations do not account for switched OFF access points. Various embodiments of the present technology, however, provide methods and systems for location estimation in a multi-floor environment that are capable of overcoming these and other obstacles and providing additional benefits. A location estimation system configured to estimate user location in a multi-floor environment, such as the multi-floor environment 100, is described herein with reference to FIG. 2.

Figure 2:
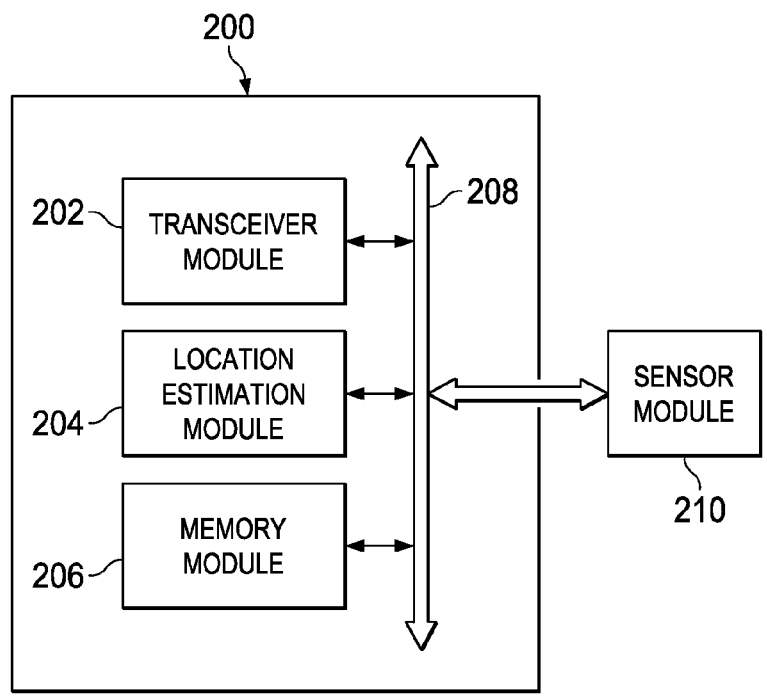
FIG. 2 is a simplified block diagram of an example location estimation system in accordance with an embodiment.

FIG. 2 is a simplified block diagram of an example location estimation system 200 (referred to hereinafter as system 200) in accordance with an embodiment. In an embodiment, the system 200 may be included within a user device, such as the user device 130 of FIG. 1. Accordingly, the system 200 may be included within one of a cellular phone, a Smartphone, a laptop, a tablet PC and the like. In FIG. 2, the system 200 is depicted to include a transceiver module 202, a location estimation module 204 and a memory module 206. The transceiver module 202, the location estimation module 204 and the memory module 206 are communicatively associated with each other via bus 208. Examples of the bus 208 may include, but is not limited to, a data bus, a control bus and the like. The bus may be, for example, a serial bus, a unidirectional bus or a bi-directional bus. In an embodiment, various components of the system 200, such as the transceiver module 202, the location estimation module 204, the memory module 206 and the bus 208 may be implemented as hardware, software, firmware or any combination thereof. In an embodiment, the system 200 may be communicatively associated with a sensor module 210. In an embodiment, the sensor module 210 may include one or more initial measurement unit (IMU) sensors like a pressure sensor (for sensing pressure), a gyroscope (for sensing angular velocity), an e-compass (for sensing earth's magnetic field), an accelerometer (for sensing acceleration) and the like. The sensor module 210 may be included within the user device or may be external to the user device and communicably associated with the system 200.

The transceiver module 202 is configured for wireless access conforming to WLAN standards/specifications, such as the IEEE 802.11 a/b/c/g specifications. In some embodiments, the transceiver module 202 may be extended to conform to specifications for NFC communication, Bluetooth information exchange and/or Zigbee network access. In an embodiment, the transceiver module 202 is configured to perform a wireless scanning so as to receive wireless signals from one or more access points from among a plurality of access points positioned at plurality of locations, respectively, at one or more floors from among a plurality of floors within the multi-floor environment, such as the building 102 of FIG. 1.

In an embodiment, the location estimation module 204 is configured to compute a first set of received signal strength indication (RSSI) measurements corresponding to the received wireless signals. It is noted that, in accordance with an example implementation, the location estimation module 204 may be either a physical module (e.g., an integrated circuit chip or package) or a software module. In accordance with a second example implementation, however, the location estimation module 204 is a location estimation device (or location estimation machine) specifically configured to implement various embodiments of the present technology. In an embodiment, the location estimation module 204 may be embodied as a multi-core processor, a single-core processor, or a combination of one or more multi-core processors and one or more single-core processors. For example, the location estimation module 204 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the location estimation module 204 may be configured to execute hard-coded functionality. In an embodiment, the location estimation module 204 may be embodied as an executor of software instructions, wherein the instructions may specifically configure the location estimation module 204 to perform the algorithms and/or operations described herein when the instructions are executed. The location estimation module 204 may include, among other things, a clock, an arithmetic logic unit (ALU) and logic gates configured to support an operation of the location estimation module 204. In an embodiment, the location estimation module 204 may be an advanced reduced instruction set computer (RISC) machine (ARM) processor. It is noted that though the location estimation module 204, as explained herein, is configured to compute the first set of RSSI measurements corresponding to the received wireless signals, in some embodiments, the computation may be performed by a remote device (for example, a server) external to the location estimation system 200 which may be communicating with the location estimation module 204.

In an embodiment, the memory module 206 is configured to store the media access control (MAC) address and/or service set identification (SSID) address along with the first set of RSSI measurements corresponding to the received wireless signals from access points. Examples of the memory module 206 include, but are not limited to, a random access memory (RAM), a synchronous dynamic RAM (SDRAM), a double data rate SDRAM (DDR SDRAM), and the like.

In an embodiment, the location estimation module 204 is configured to identify a primary set of access points and a secondary set of access points from among the plurality of access points subsequent to performing wireless scanning. In an embodiment, the primary set of access points correspond to those one or more access points from which wireless signals are received during the wireless scanning (for example, the current instance of wireless scanning), and, the secondary set of access points correspond to those access points whose presence has been ascertained previous to the wireless scanning (for example, previous instances of wireless scanning) and from which wireless signals are not received during the current instance of wireless scanning. The access points corresponding to the primary set of access points are hereinafter referred to as visible access points, and, the access points corresponding to the secondary set of access points are hereinafter referred as invisible access points. When a user is navigating in a multi-floor environment, the transceiver module 202 may perform a wireless scan to receive wireless signals from access points in the vicinity of the user. For example, if a user is at floor 108 of the building 102 of FIG. 1, the transceiver module 202 in the user device may receive wireless signals from access points 122, 124 and 118 (i.e. access points in vicinity of the user 128) upon performing the wireless scan. Such access points, from which the wireless signals are received by the transceiver module 202 during the current instance of wireless scanning, are referred herein as visible access points. Further, the transceiver module 202 may also be aware of presence of access points, such as access points 126 and 120 which are in the vicinity of the user 128, but no wireless signal is received from these access points. For example, wireless signals may have been received from some access points during previous instances of wireless scans and from which wireless signals are not received during the current instance of wireless scan. Such access points are referred herein as invisible access points. In an embodiment, the transceiver module 202 may be aware of the presence of invisible access points on account of a number of factors. For example, in FIG. 1, the user 128 may have encountered the access point 126 on floor 110 as a visible access point en-route to floor 108. Upon reaching the floor 108, wireless signals from the access point 126 may be unavailable, and, accordingly the access point 126 may be identified as an invisible access point. In some embodiments, the one or more access points may have been encountered during a previous visit to the multi-floor environment and hence based on availability of signals may be termed as one of visible or invisible access points.

In an embodiment, a database of all access points of the plurality of access points along with their respective location co-ordinates is maintained and utilized for identification of the access points as one of visible access points and invisible access points. In an embodiment, the memory module 206 is configured to store such a database. In an embodiment, the transceiver module 202 receives data corresponding to the database from an external source and subsequently stores the information in the memory module 206. In an embodiment, the transceiver module 202 in conjunction with the memory module 206 dynamically builds a database comprising a table of the visible and invisible access points in an on-going manner upon receiving wireless signals from access points from among the plurality of access points. In an embodiment, only those access points, which are in the vicinity of the visible access points, are identified as invisible access points. For example, if the database includes 100 access points along with their corresponding location co-ordinates, and, if the transceiver module 202 currently located on floor 2 receives wireless signals from five access points (i.e. visible access points), then only those access points which are in vicinity of floor 2, for example on floors 1 and 3, and from which wireless signals have not been received may be identified as invisible access points from among the 100 access points. In an embodiment, the identification of the invisible access points and a subsequent inclusion of such access points in user location computation improve an estimation accuracy of the said computation. An example improvement in the estimation accuracy on account of inclusion of the invisible access points is explained with reference to FIG. 3.

Figure 3:
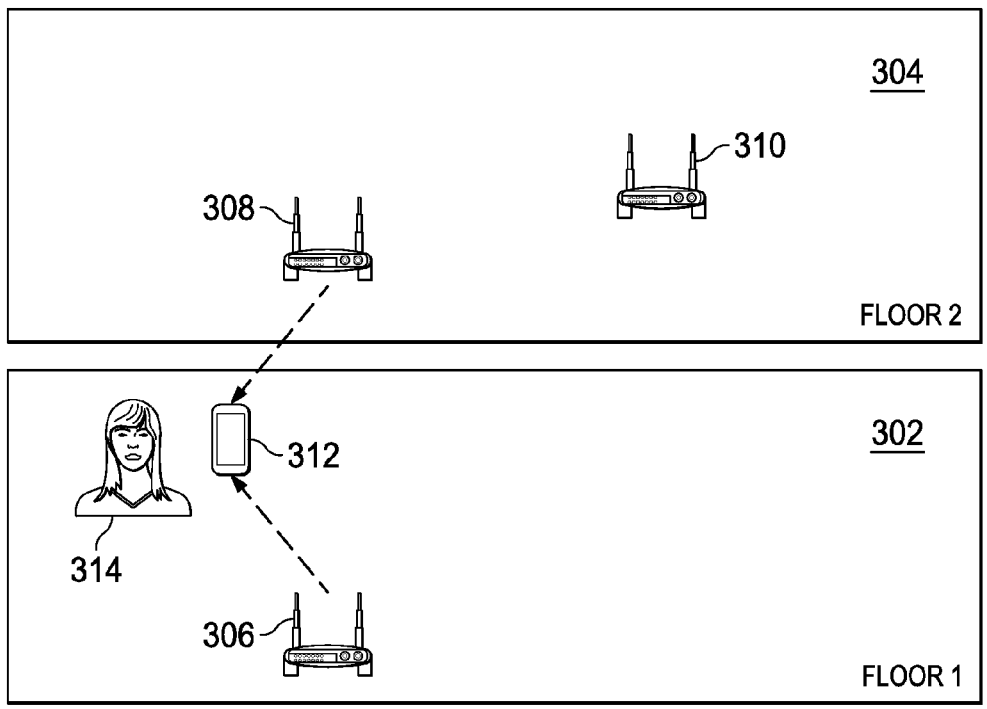
FIG. 3 depicts a perspective view of a second example multi-floor environment for illustrating an example improvement in accuracy of user floor location computation by inclusion of invisible access points in accordance with an embodiment.

Referring now to FIG. 3, a perspective view of a second example multi-floor environment 300 is depicted for illustrating an example improvement in accuracy of user floor location computation by inclusion of invisible access points in accordance with an embodiment. The multi-floor environment 300 is depicted to include two floors—floor 302 and floor 304. The floor 302 is depicted as 'FLOOR 1' and the floor 304 is depicted as 'FLOOR 2' in FIG. 3. It is noted that the multi-floor environment 300 is depicted to include two floors for illustration purposes and that the multi-floor environment 300 may include more number of floors. In FIG. 3, the floor 302 is depicted to include one access point 306 and the floor 304 is depicted to include two access points 308 and 310 for illustration purposes. A user device 312 associated with a user 314 and including the system 200 of FIG. 2 may receive wireless signals from one or more access points in the multi-floor environment 300. If the user 314 is currently located at FLOOR 1 then the user device 312 may receive wireless signals from access points 306 and 308, respectively. Accordingly, the access points 306 and 308 may be termed as visible access points. The user device 312 may not receive wireless signals from the access point 310 (i.e. the access point 310 may be regarded as the invisible access point).

If only the visible access points are included in the user floor location computation and if the RSSI associated with received wireless signals from the access point 306 and 308 are equal, then a determination of a floor on which the user 314 is currently located is difficult as equal strength signals are received from access points from two floors. The ambiguous floor location may degrade the estimation of user floor location. However, if invisible access points are included in the user location computation, then an ambiguity in estimating user floor location may be precluded thereby improving an accuracy of estimating user location. For example, in FIG. 3, if a presence of access point 310 is known to the user device 312 and wireless signals are not being received from the access point 310 (i.e. the access point 310 is an invisible access point), then a possibility of the user being on FLOOR 2 is substantially reduced, thereby aiding user floor location and hence user location estimation in a fairly accurate manner. The estimation of the user floor location is further explained below.

Referring now to FIG. 2, the location estimation module 204 is further configured to compute a geometric measure based on locations associated with each access point from among the visible access points and the invisible access points. In an embodiment, the geometric measure is one of a centroid measure and a RSSI weighted centroid measure. The computation of the geometric measure is explained with reference to FIG. 4.

Figure 4:
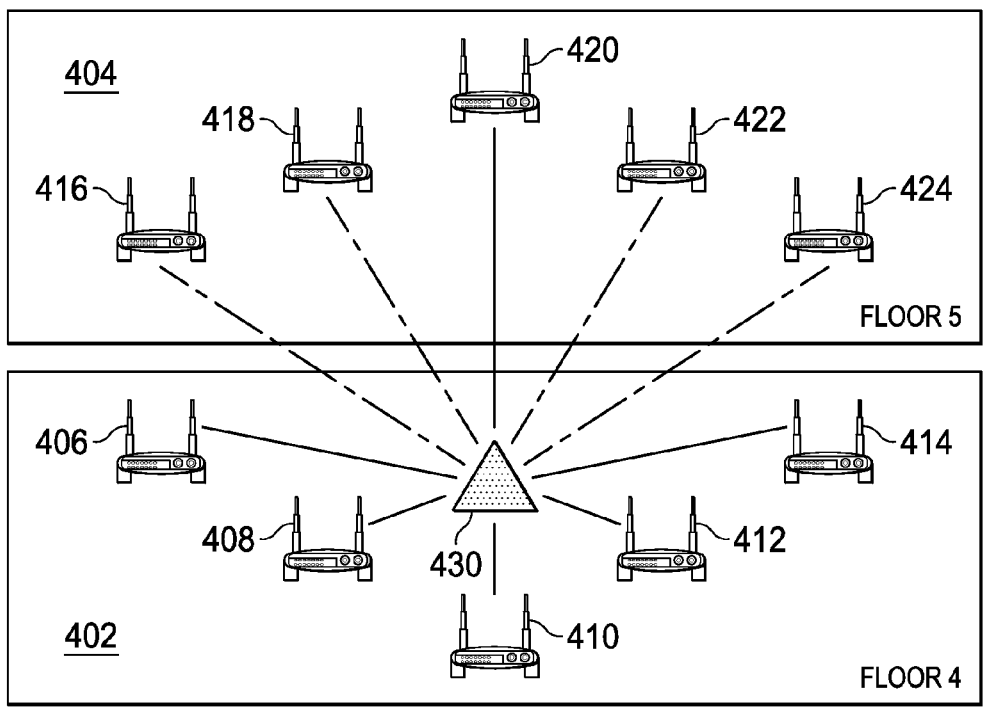
FIG. 4 depicts a perspective view of a third example multi-floor environment for illustrating computation of a geometric measure in accordance with an embodiment.

Referring now to FIG. 4, a perspective view of a third example multi-floor environment 400 (hereinafter referred to as multi-floor environment 400) is depicted for illustrating computation of a geometric measure in accordance with an embodiment. The multi-floor environment 400 is depicted to include two floors—floor 402 and floor 404. The floor 402 is depicted as 'FLOOR 4' and the floor 404 is depicted as 'FLOOR 5' in FIG. 4. It is noted that the multi-floor environment 400 is depicted to include two floors for illustration purposes and that the multi-floor environment 400 may include more number of floors. In FIG. 4, the floor 402 is depicted to include access points 406, 408, 410, 412 and 414 and the floor 404 is depicted to include access points 416, 418, 420, 422 and 424. It is noted that the access point geometry as depicted in FIG. 4 is included herein for illustration purposes only and may not be considered to be limiting the scope of the present technology.

In FIG. 4, access points 406, 408, 410, 412, 414 and 420 are depicted to be identified as visible access points, and, the access points 416, 418, 422 and 424 are depicted to be identified as invisible access points. More specifically, the transceiver module 202 receives wireless signals from access points 406, 408, 410, 412, 414 and 420, and, receives no signals from access points 416, 418, 422 and 424 even though the transceiver module 202 is aware of the presence of these access points in the vicinity. As explained with reference to FIG. 3, the identification of the invisible access points assists in estimation of the user floor location. A geometric measure is computed based on the visible/invisible access point geometry by the location estimation module 204. For example, in FIG. 4, a centroid 430 is depicted to be computed based on the locations of the visible access points and the invisible access points. In an embodiment, weights may be assigned to RSSI measurements corresponding to the locations of the visible access points and the weighted RSSI measurements may be factored in the computation of the centroid 430.

Referring now to FIG. 2, the location estimation module 204 may utilize the geometric measure to compute a user floor location and then utilize the user floor location along with the computed RSSI measurements to determine the user location in the multi-floor indoor environment. In an embodiment, the location estimation module 204 is configured to generate an imaginary 3D grid of finite size around the computed geometric measure, such as the centroid 430, for lower complexity implementation. The 3D grid is configured to extend across one or more floors in the multi-floor environment and comprise a plurality of grid points. In an embodiment, the location estimation module 204 is configured to compute a likelihood value at each grid point of the plurality of grid points. In an embodiment, computing the likelihood value corresponds to computing a probability of user being located at floor 'f' given the received first set of RSSI measurements denoted by '$\underline{R}$', i.e. $p(f/\underline{R})$.

In an embodiment, the location estimation module 204 is further configured to compute a pre-defined objective function, which is configured to maximize a probability of the user being located at a floor from among the plurality of floors in the multi-floor indoor environment. In an embodiment, the pre-defined objective function is maximum a posteriori (MAP) probability distribution function. For example, in an embodiment, a pre-defined objective function '$f_{Map}$' (i.e. a MAP probability distribution function) is defined as a function, which maximizes a probability of the user being located at floor 'f' given the received first set of RSSI measurements denoted by '$\underline{R}$'. Such a pre-defined objective function is depicted in equation (1) below:

$$\hat{f}_{MAP} = \underset{f}{\mathrm{argmax}}\, p(f/\underline{R}) \tag{1}$$

The parameters of equation (1) may be rearranged based on Bayes theorem to configure equation (2) as depicted below:

$$\hat{f}_{MAP} = \underset{f}{\mathrm{argmax}}\, \frac{p(\underline{R}/f)p(f)}{p(\underline{R})} \tag{2}$$

In equation (2), the function $p(\underline{R})$ corresponding to the probability of the user receiving the RSSI measurements '$\underline{R}$' does not influence the MAP probability distribution function and hence the equation (2) is rewritten as depicted in equation (3) below:

$$\hat{f}_{MAP} = \underset{f}{\mathrm{argmax}}\, p(\underline{R}/f)p(f) \tag{3}$$

An estimation uncertainty 'Unc' associated with floor computation based on equation (3) may be computed as depicted in equation (4) below:

$$Unc = \underset{f \neq f_{MAP}}{\mathrm{argmax}}\{10 * \log_{10}\{p(f/\underline{R})/p(\hat{f}_{MAP}/\underline{R})\}\} \tag{4}$$

The likelihood function $p(\underline{R}/f)$ can be computed using the partition theorem as depicted in equation (5) below:

$$p(\underline{R}/f) = \int_{u \in grid} p(\underline{R}/f, u)p(u)du \tag{5}$$

where $u=(x, y)$ is a grid point of the imaginary 3D grid formed on floor 'f'.

If the RSSI measurements of all visible access points are considered to be independent from each other, then the function $p(\underline{R}/f, u)$ may be written as depicted in equation (6) below:

$$p(\underline{R}/f, u) = \prod_{i=1}^{N} p(R_i/f, u) \tag{6}$$

Where N is the number of visible access points detected by the transceiver module 202 and $p(R_i/f,u)$ is the probability of receiving RSSI measurement $(R_i)$ from the $i^{th}$ visible access point given the user is at grid location u on floor 'f.'

As explained with reference to FIG. 3, the invisible access points assist in improving the accuracy of estimating user location and information corresponding to the invisible access points may be incorporated in equation (6) as follows:

Assuming a set V of visible access points, and a set $\bar{V}$ of invisible access points, the modified equation (6) to be computed for each possible position $u=(x, y)$ on floor 'f' may be written as depicted in equation (7):

$$P(\underline{R}|f, u) = \prod_{i \in V}^{N} P(R_i|f, u)P(V_i|u, f) \prod_{j \in \bar{V}} P(\bar{V}_j|u, f) \tag{7}$$

Where $P(V_i|u,f)$ is the probability that the $i^{th}$ access point in V is visible at the particular position u on floor 'f'. This depends on the distance between grid-point u and $i^{th}$ visible access point. Similarly $P(\bar{V}_i|u,f)$ denotes the probability that that the $j^{th}$ access point in $\bar{V}$ is invisible at the position u on floor 'f', which also depends on the distance between u and the $j^{th}$ invisible access point.

In an embodiment, the probability $P(R_i|f,u)$ is estimated based on a 3D channel model comprising a plurality of channel model parameters. In an embodiment, the plurality of channel model parameters include at least one of log-normal shadowing model parameters and a parameter accounting for signal attenuation across floors in the multi-floor environment. In an embodiment, the log-normal shadowing model parameters may include a reference RSSI and a path loss coefficient. In an embodiment, an example of the parameter accounting for signal attenuation across floors in the multi-floor environment may be a measure by which an RSSI measurement of an access point in an adjacent floor is attenuated as compared to the RSSI measurement of an access point in a same floor at the same distance from the access point. In an embodiment, the attenuation (i.e. the difference between the RSSI at floor X and the RSSI at floor X+1 for the same distance from an access point) is termed as 'Floor Attenuation Factor' (hereinafter referred to as 'FAF'). In an embodiment, the 3D channel model including log-normal shadowing model parameters and a floor attenuation factor is approximated as depicted in equation (8):

$$R(d,f) = R_0 + 10n \log_{10}(d_0/d) - \Delta(f, f_0) + w \quad (8)$$

where, R is the RSSI in dBm at a distance d from an access point, $R_0$ is the reference RSSI at the reference distance $d_0$, n is the path loss coefficient, $\Delta$ is the floor attenuation factor in dB which is a function of both access point installed floor location $f_0$ as well as the observation floor $f$ and w is a zero mean additive white Gaussian noise with variance $\sigma^2$.

In an embodiment, the channel model parameters may vary for different access points. For example, the reference RSSI and/or the path loss coefficient may vary from one access point to another. In an embodiment, the location estimation module 204 designs a suitable channel model by measuring the RSSI of an access point across various location of the multi-floor environment. For example, the floor attenuation factor may be computed as follows:

If an access point located at floor X is associated with an RSSI measurement of −40 decibels milliwatt (dBm) at distance d from the access point on floor X and the RSSI measurement of the same access point when measured at floor X+1 at same distance d from the access point is −50 dBm, then the FAF for floor X+1 is determined to be 10 dB. The computation of FAF is explained with reference to RSSI measurements for one access point in FIG. 5.

Figure 5:
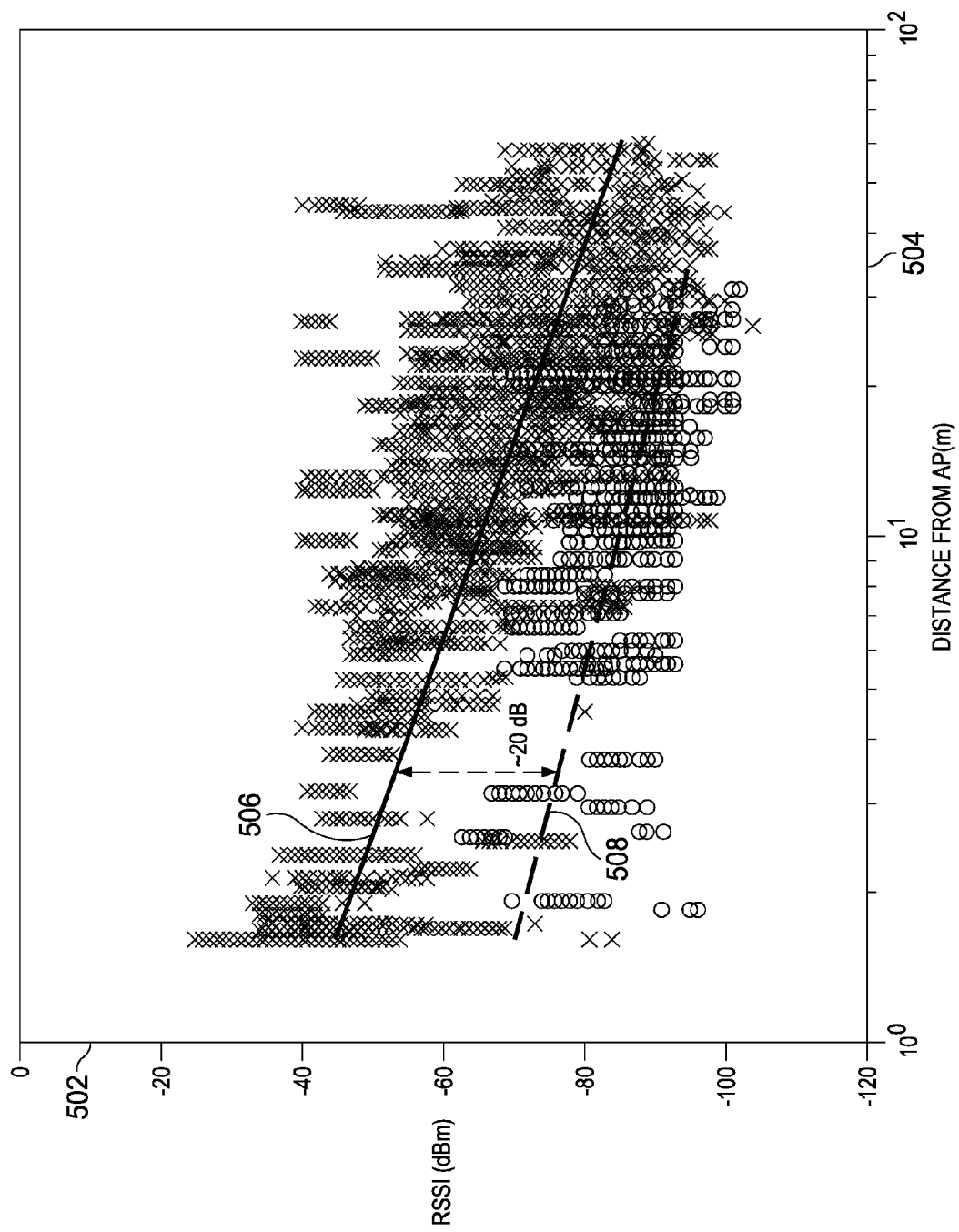
FIG. 5 depicts an example graph representing RSSI measurements corresponding to wireless signals received from an access point and measured as a function of distance for illustrating computation of floor attenuation factor in accordance with an embodiment.

FIG. 5 depicts an exemplary graph 500 representing RSSI measurements corresponding to wireless signals received from an access point and measured as a function of distance for illustrating computation of FAF in accordance with an embodiment. More specifically, the RSSI measurements received at various distances from an access point are depicted on Y-axis 502 (measured in dBm and including values ranging from 0 dBm to −120 dBm) and the corresponding distances from the access point are depicted on X-axis 504 (measured in meters 'm' and including values ranging from 0 m to 100 m). For an access point on floor M, the distribution of RSSI measurements at various distances on floor M are plotted as 'x', and, for the same access point, the distribution of RSSI measurements received at various distances on floor 'M+1' are plotted as 'o'. A first average RSSI (depicted by line 506) corresponding to the access point is computed from all RSSI measurements at various distances on floor "M". Similarly, a second average RSSI (depicted by line 508) corresponding to the same access point is computed from all RSSI measurements at various distances on floor 'M+1'. Both the average RSSI plots are computed by averaging all RSSI measurements for same distance for the corresponding floor. The difference between the first average RSSI and the second average RSSI (depicted as 20 dB) may be determined to be the FAF for floor 'M+1' for all access points on floor 'M'.

As explained with reference to FIG. 4, the location estimation module 204 is configured to generate an imaginary 3D grid comprising a plurality of grid points based on the geometric measure and compute a value of the P(R/f,u) as depicted in equation (7)) at each grid point of the plurality of grid points. The value of the P(R/f,u) is computed using the 3D channel model parameter explained with reference to Equation (8). In an embodiment, the location estimation module 204 is further configured to identify a set of grid points associated with a floor location from among the one or more floors such that their associated likelihood values when averaged maximizes the pre-defined objective function. In an embodiment, the location estimation module 204 is configured to identify floor location information associated with the set of grid points as the absolute floor location information. For example, if the imaginary 3D grid extends across floors 2, 3 and 4 and the likelihood values are computed for grid points across the floors 2, 3 and 4, and it is determined that the average value of the likelihood function for a set of grid points corresponding to floor 3 maximizes the pre-defined objective function, then floor information associated with floor 3 is determined to be the absolute floor location information. In an embodiment, the absolute floor location information includes an absolute floor location estimate and a first uncertainty estimate associated with the absolute floor location estimate. For example, the absolute floor location information identified may include an absolute floor number, for example floor number 3, that the user is most likely to be located at, and an estimate of uncertainty associated with the absolute floor location estimate of floor 3. For example, the first uncertainty estimate may be −10 dB, indicating that the probability of the user being on floor 3 is almost ten times higher than the probability of the user being on any other floor in the multi-floor environment.

As explained above, the determination of the absolute floor location estimate is performed based on computing a geometric measure and then computing a value of the pre-defined objective function. The computation of the geometric measure and the pre-defined objective function is in-turn performed based on RSSI measurements, or in other words, based on received wireless signals. Hence, the determination of the absolute floor location estimate may be termed to be wireless signal based floor determination. However, in certain scenarios, it is observed that the wireless signal based floor determination may not be completely reliable. For example, in outage areas of the multi-floor environment, such as areas including or in the vicinity of an elevator or a staircase, an access point visibility may be poor, unreliable or non-existent. Moreover, even in cases when a user is walking on the same floor, occasionally, the wireless signal based floor determination may be biased by access points having strong RSSI from other floors than the current floor (for example, in instances where a user is standing right above an access point installed on a floor right below the current floor). In such cases, combining relative floor determination using a pressure sensor with wireless signal based floor determination improves an overall user 3D positioning as will be explained below:

The sensor module 210 may include a pressure sensor (for example, an altimeter), which may be configured to sense the pressure and provide the change in pressure readings corresponding to user movements in the multi-floor environment to the location estimation module 204. In an embodiment, the location estimation module 204 is further configured to determine relative floor location information based on pressure sensor measurements received from the pressure sensor in the sensor module 210. The relative floor location information includes a relative floor location estimate and a second uncertainty estimate associated with the relative floor location estimate. For example, the relative floor location information may include a relative floor location estimate, such as an estimate that a user has moved five floors relative to the initial floor, and, an estimate of uncertainty associated with the relative floor location estimate of change in the number of floors that the user has traversed. For example, the second uncertainty estimate may be 30%, indicating that the probability of the user having moved five floors is 70% certain.

It is noted that altitude information from the pressure sensor in the sensor module 210, by itself, may be highly inaccurate for the purpose of absolute floor determination. For example, the altitude measurements may be corrupted by large random biases rendering the absolute altitude information inefficient for the purpose of absolute floor determination. However, the relative change in altitude is quite accurate and may be used to determine relative change in user floor location.

The location estimation module 204 is configured to receive altitude measurements at a current instant in time and at a delayed instant in time. In an embodiment, the location estimation module 204 is configured to compute the relative floor location estimate (i.e. a number of floors traversed by a user) with the corresponding uncertainty in the estimate by comparing a change in altitude associated with the user movements to a relative floor height value. In an embodiment, the memory module 206 may be configured to store a database of relative heights of all the floors in a multi-floor environment. The location estimation module 204 computes the change in the altitude measurements received at current and delayed time instants and compares the change in altitude measurements against the floor height values corresponding to relative heights of the different floors in the multi-floor environment to determine a number of floors the user has traversed.

In some embodiments, the database of relative heights of floors in a multi-floor environment may be learnt over a period of time and subsequently adapted. In absence of such a database, values of relative floor heights are assumed to be same for all floors in one or more buildings and its value may be initially selected to be typical floor height of four meters. However, the values of relative floor heights in the database are dynamically updated over time using wireless signal based floor determination, as will be explained later in conjunction with FIG. 11.

In an embodiment, the location estimation module 204 is configured to determine a user floor location along with a third uncertainty estimate by optimally weighing the absolute floor location estimate and the relative floor location estimate based on the first uncertainty estimate and the second uncertainty estimate. In an embodiment, the location estimation module 204 may optimally weigh the absolute floor location estimate and the relative floor location estimate based on the first uncertainty estimate and the second uncertainty estimate in a Kalman filter based algorithm. As explained above, the absolute floor location information (i.e. the absolute floor location estimate along with corresponding first uncertainty estimate) is determined based on wireless signal based floor determination and the relative floor location information (i.e. relative user floor estimate along with corresponding second uncertainty estimate) is determined using pressure sensor measurements. The absolute floor location estimate and the relative floor location estimate are optimally weighed based on the first uncertainty estimate and the second uncertainty estimate in a Kalman filter based algorithm to determine the user floor location along with a third uncertainty estimate. For example, the location estimation module 204 determines $\Delta f_{k-a}^S$, and $Q_{k-1}^S$ based on pressure sensor measurements, where $\Delta f_{k-1}^S$, is the number of floors traversed by the user (i.e. relative floor location estimate) at time k−1 and $Q_{k-1}^S$ is the associated uncertainty (i.e. second uncertainty estimate) of the number of floor traversed at time k−1. Further, the location estimation module 204 determines $f_k^W$ and $R_k$ based on received RSSI measurements and the pre-defined objective function as explained with reference to FIGS. 2 and 3, where $f_k^W$ is the output of the wireless signal based floor determination (i.e. absolute floor location estimate) at time k and $R_k$ is the associated uncertainty (i.e. first uncertainty estimate). Then, the Kalman filter formulation includes performing time updation and a measurement updation. The time update at time 'k' involves predicting state estimate as depicted in equation (9) and predicting state co-variance as depicted in equation (10):

$$\hat{f}_{k/k-1}^B = \hat{f}_{k-1/k-1}^B + \Delta f_{k-1}^S \tag{9}$$

$$P_{k/k-1}^B = P_{k-1/k-1}^B + Q + Q_{k-1}^S \tag{10}$$

where Q is the process noise parameter, which controls the bandwidth of the Kalman filter and is tuned for an optimal performance. The measurement update at time 'k' involves measurement innovation or residual as depicted in equation (11), Kalman Gain update as depicted in equation (12), updated state estimate as depicted in equation (13) and updated state co-variance as depicted in equation (14):

$$r_k = f_k^W - \hat{f}_{k/k-1}^B \tag{11}$$

$$K_k = \frac{P_{k/k-1}^B}{P_{k/k-1}^B + R_k} \tag{12}$$

$$\hat{f}_{k/k}^B = \hat{f}_{k/k-1}^B + K_k * r_k \tag{13}$$

$$P_{k/k}^B = (1 - K_k) * P_{k/k-1}^B \tag{14}$$

Further, the state corresponding to the optimally weighed floor ($\hat{f}_{k/k}^B$) is quantized to nearest floor number for final user floor location estimate as depicted in equation (15) below:

$$\hat{f}_{k/k,Final}^B = \text{round}(\hat{f}_{k/k}^B) \tag{15}$$

At each instant of time, the Kalman filter iteratively performs time and measurement update, as depicted in equations (9) to (15), to determine the user floor location (given by $\hat{f}_{k/k,Final}^B$) along with the corresponding third uncertainty estimate (given by $P_{k/k}^B$).

In an embodiment, the location estimation module 204 is further configured to compute a context of the user location based on accelerometer measurements and the pressure sensor measurements. The measurements from the sensor module 210 may be utilized to learn a context of user location in which the user is navigating and the context information may be utilized in improving an overall accuracy of the user positioning. In an embodiment, the context of the user location is one of a staircase context, an elevator context, an escalator context and an on-floor context. More specifically, the measurements from the sensor module 210 may be utilized to determine whether the user is moving on a staircase, an elevator, an escalator or on a floor within the multi-floor environment. The detection of context of user location is further explained with reference to FIGS. 6, 7, 8 and 9.

Figure 6:
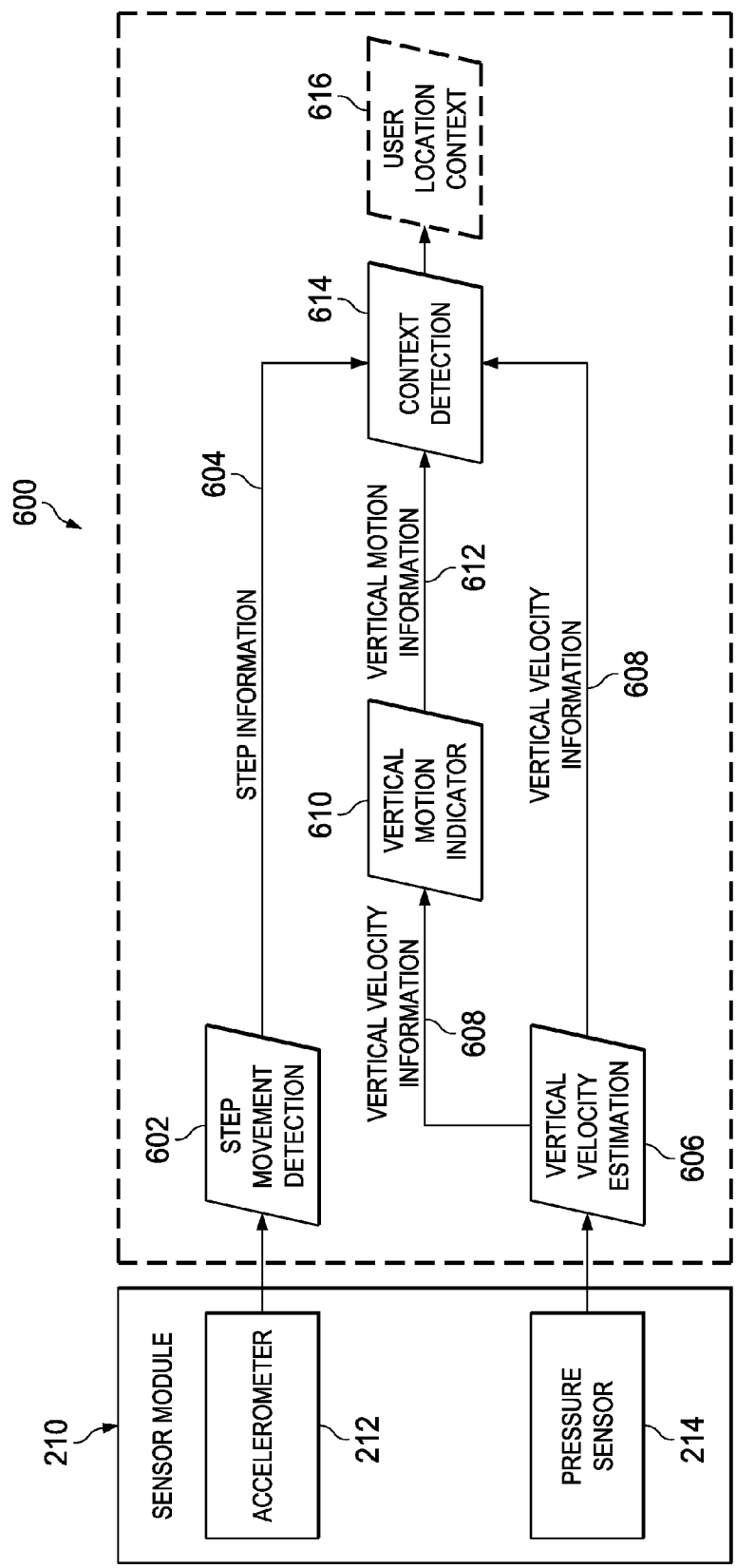
FIG. 6 illustrates a block diagram of an example process flow for a determination of a context of a user location in accordance with an embodiment.

FIG. 6 illustrates a block diagram of an example process flow 600 for a determination of a context of a user location in accordance with an embodiment. The process flow 600 may be performed by the system 200 of FIG. 2 for determination of the context of user location. More specifically, the location estimation module 204 of the system 200 may perform the process flow 600. The block diagram further depicts the sensor module 210 of FIG. 2. The sensor module 210 is depicted to include an accelerometer 212 and a pressure sensor 214. Though the sensor module 210 is depicted to include the accelerometer 212 and the pressure sensor 214 only, it is noted that, the sensor module 210 may include other types of sensors, such as an e-compass, gyroscope and the like.

At 602 of the process flow 600, information about the user movements in the multi-floor environment is received from the accelerometer 212 in form of accelerometer measurements. At 602, a presence of step movements associated with user movements is detected (for example, by the location estimation module 204) based on accelerometer measurements received from the accelerometer 212. The output of the detection of the presence of step movements is depicted as 'step information 604' in FIG. 6.

At 606 of the process flow 600, pressure measurements corresponding to the user movements are received from the pressure sensor 214 and a vertical velocity estimation is performed based on the pressure sensor measurements to determine vertical velocity information 608. The vertical velocity information 608 is then compared against a pre-defined threshold in vertical motion indication block 610 to generate vertical motion information 612. At 614 of the process flow 600, a context detection of the user location in the multi-floor environment is performed based on the step information 604, the vertical velocity information 608 and the vertical motion information 612 to compute the context of user location 616. More specifically, the step information 604 (implying user movement) with vertical velocity information 608 (implying change in altitude associated with user movement) and vertical motion information 612 (implying up or down movement associated with the change in altitude) are combined to determine the context of user location from among one of a staircase context, an elevator context, an escalator context and an on-floor context. For example, if the vertical motion information 612 indication suggests that there is no vertical movement of the user in the multi-floor environment, then it is concluded that a context of user location is the on-floor context implying that the user is navigating on a floor within the multi-floor environment. Such information is useful during user location computation as it filters out the erroneous floor change heavily influenced by the absolute floor location estimate. The determination of the staircase context is further explained with reference to FIG. 7.

Figure 7:
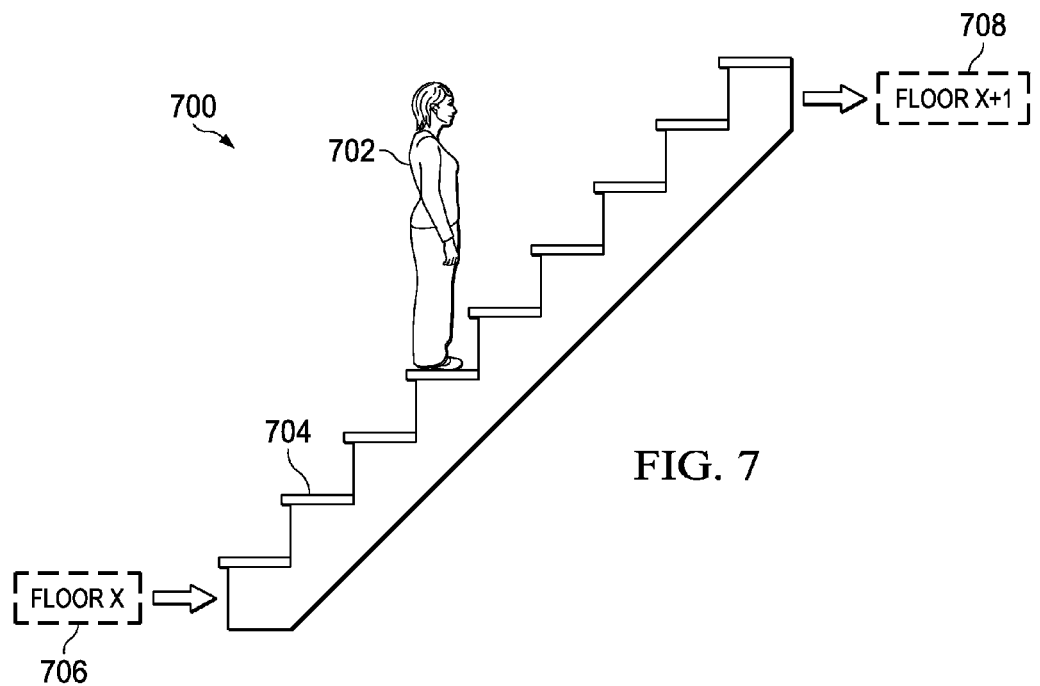
FIG. 7 depicts a perspective view of a fourth example multi-floor environment for illustrating an example determination of a staircase context in accordance with an embodiment.

FIG. 7 depicts a perspective view of a fourth example multi-floor environment 700 (hereinafter referred to as multi-floor environment 700) for illustrating an example determination of a staircase context in accordance with an embodiment. More specifically, FIG. 7 depicts a perspective view of a user 702 navigating a staircase 704 in the multi-floor environment 700. The user 702 is depicted to be navigating from floor 706 (depicted as Floor 'X' in FIG. 7) to floor 708 (depicted as Floor 'X+1' in FIG. 7) using the staircase 704 in the multi-floor environment 700. The user 702 may be associated with a user device including a system (not shown in FIG. 7), such as the system 200 of FIG. 2, which is communicably coupled with a sensor module, such as the sensor module 210. The sensor module includes an accelerometer, which is configured to facilitate detection of user step movements. Further, the sensor module includes a pressure sensor, which is configured to sense change in altitude whenever a user performs vertical movement in the multi-floor environment 700. In an embodiment, a vertical velocity is estimated from the filtered altitude measurements. The vertical velocity estimate is then compared against a pre-defined threshold to estimate vertical motion. If the step information indicates a presence of step movements by the user 702 and vertical motion indication suggests vertical movement of the user 702 in the multi-floor environment 700, then it is concluded that the context of user location is a staircase as the user 702 is taking steps, which is associated with change in altitude. The determination of the staircase context may be useful in user positioning in the multi-floor environment 700. For example, since most of the staircases have single entry-exit points, determining a staircase context of user location implies that the user 702 is in vicinity of only two exit points, which may be resolved using robust floor discrimination based on RSSI measurements and pressure sensor measurements. Such information may also be blended with map information thereby containing the error in positioning, which may drift since typically wireless signal reception is either weak or unreliable in outage areas, such as those associated with staircases. The determination of the elevator context is explained with reference to FIG. 8.

Figure 8:
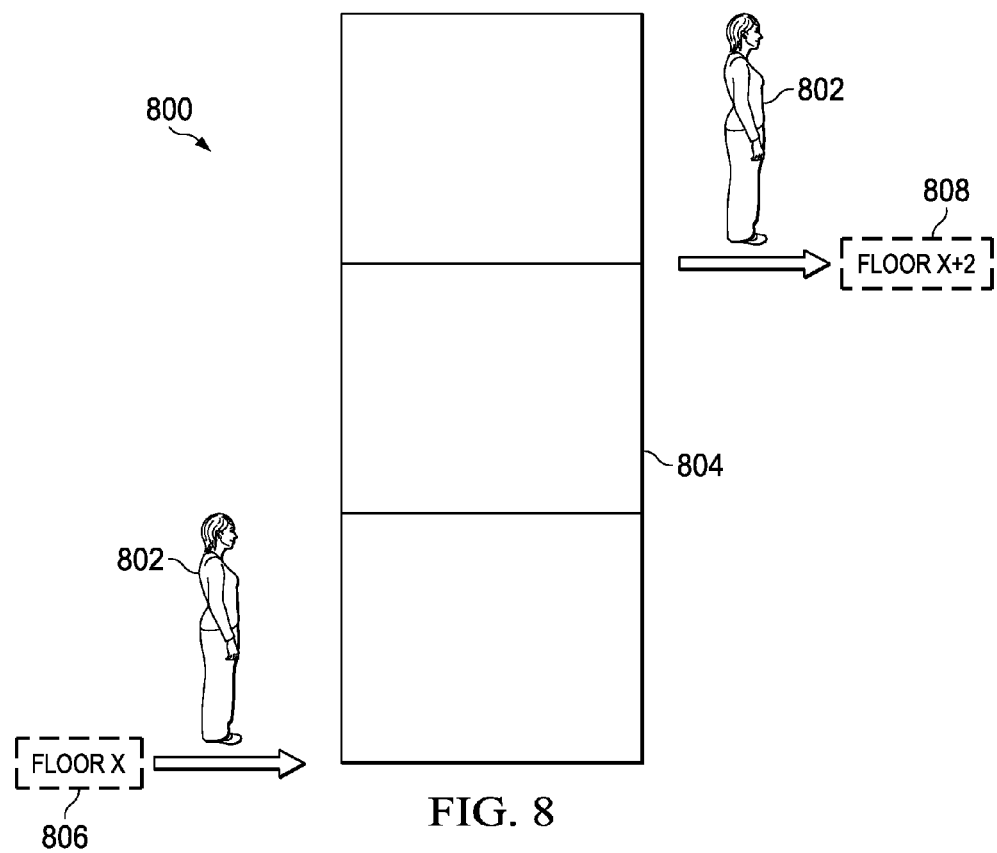
FIG. 8 depicts a perspective view of a fifth example multi-floor environment for illustrating an example determination of an elevator context in accordance with an embodiment.

FIG. 8 depicts a perspective view of a fifth example multi-floor environment 800 (hereinafter referred to as multi-floor environment 800) for illustrating an example determination of an elevator context in accordance with an embodiment. More specifically, FIG. 8 depicts a user 802 navigating in an elevator 804 in the multi-floor environment 800. The user 802 is depicted to be navigating from floor 806 (depicted as Floor 'X' in FIG. 8) to floor 808 (depicted as Floor 'X+2' in FIG. 8) using the elevator 804 in the multi-floor environment 800. The user 802 may be associated with a user device including a system (not shown in FIG. 8), such as the system 200 of FIG. 2, which is communicably coupled with a sensor module, such as the sensor module 210. The sensor module includes an accelerometer, which is configured to facilitate detection of user step movements. Further, the sensor module includes a pressure sensor, which is configured to sense change in altitude whenever a user performs vertical movement in the multi-floor environment. A vertical velocity is estimated from the filtered altitude measurements. The vertical velocity estimate is then compared against a pre-defined threshold to estimate vertical motion.

If vertical velocity estimate falls within a first pre-defined range and there is no step detection (implying that there is upward movement with a certain velocity but no steps are taken), then it is concluded that the context of user location is an elevator. In an example embodiment, the first pre-defined range for vertical velocity estimate may vary from 0.38 meters/second (m/s) to 9 m/s (i.e. typical vertical velocity of elevators determined empirically). The determination of the elevator context may be useful in user positioning in the multi-floor environment 800. For example, elevator context detection along with the number of floor traversed (can be found using relative floor discrimination) and with the help of map information may provide a current user position as soon as the user comes out of the elevator even without waiting for a new 2D location estimate based on wireless measurements on the new floor which might be unreliable. Typically, a wireless access point visibility is poor near elevator areas and hence, the error in positioning may be constrained using elevator context detection. The determination of the escalator context detection is explained with reference to FIG. 9.

Figure 9:
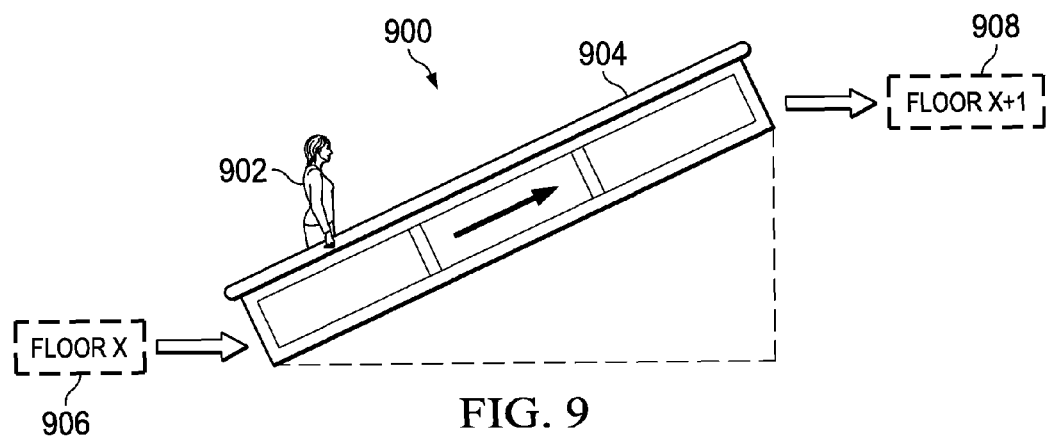
FIG. 9 depicts a perspective view of a sixth example multi-floor environment for illustrating an example determination of an escalator context in accordance with an embodiment.

FIG. 9 depicts a perspective view of a sixth example multi-floor environment 900 for illustrating an example determination of an escalator context in accordance with an embodiment. More specifically, FIG. 9 depicts a user 902 navigating in an escalator 904 in the multi-floor environment 900. The user 902 is depicted to be navigating from floor 906 (depicted as Floor 'X' in FIG. 9) to floor 908 (depicted as Floor 'X+1' in FIG. 9) using the escalator 904 in the multi-floor environment 900. The user 902 is associated with a user device including a system (not shown in FIG. 9), such as the system 200 of FIG. 2, which is communicably coupled with a sensor module, such as the sensor module 210. The sensor module includes an accelerometer, which is configured to facilitate detection of user step movements. Further, the sensor module includes a pressure sensor, which is configured to sense change in altitude whenever a user performs vertical movement in the multi-floor environment 900. A vertical velocity is estimated from the filtered altitude measurements. The vertical velocity estimate is then compared against a pre-defined threshold to estimate vertical motion.

If vertical velocity estimate falls within a second pre-defined range and there is no step detection (implying that there is upward movement with a certain velocity but no steps are taken), then it is concluded that the context of user location is an escalator. In an example embodiment, the second pre-defined range for vertical velocity estimate may vary from 0.2 m/s to 0.28 m/s (i.e. typical vertical velocity of escalators determined empirically). The determination of the escalator context may be useful in user positioning in the multi-floor environment 900. For example, escalators are more prevalent in places, such as malls, airport and the like where the association of the access points to a particular floor is not possible; thereby making a wireless signal based positioning solution less reliable. In such scenarios, the escalator context determination may be used to constrain the error in positioning by doing a consistency check with a newly updated position based on the context.

In an example embodiment, in addition to determination of context of the user location, the location estimation module 204 is configured to compute a 2D location estimate within the user floor location along with associated fourth uncertainty measure. The computation of the 2D location estimate by the location estimation module 204 is explained below:

As explained with reference to FIGS. 2 to 4, the location estimation module 204 of the system 200 is configured to determine the user floor location and the third uncertainty estimate associated with the user floor location based on optimally weighing the absolute floor location estimate and the relative floor location estimate based on the first uncertainty estimate and the second uncertainty estimate in a Kalman filter based algorithm. The location estimation module 204 is further configured to compute a 2D location estimate within a floor associated with the user floor location along with associated fourth uncertainty measure. For example, upon determining the user floor location to be floor 8, the location estimation module 204 may estimate a 2D location estimate within floor 8. In an embodiment, an imaginary 2D grid comprising a plurality of grid points is generated around a temporary 2D location on the user floor location and a probability of a user being at each grid point is computed. A minimum mean square error (MMSE) estimate is computed by averaging over the whole 2D grid, where each grid point is weighed by its probability of receiving the RSSI measurements. In an embodiment, the probability of a user being at a grid point u=(x, y, f) when a vector of N RSSI measurements R=[$R_1$ ... $R_N$] is observed, is defined as depicted in equation (16):

$$P(\underline{R}|u) = \Pi_i P(R_i|u) \quad (16)$$

where it is assumed that the RSSI measurements are statistically independent and a log-normal shadowing model for modeling $P(R_i|u)$ is utilized. The MMSE estimator may then be defined as depicted in equation (17):

$$\hat{g} = E\{u \mid \underline{R}\} = \int_u u \cdot P(u/\underline{R}) du = \int_u u \cdot P(\underline{R}/u) P(u) / P(\underline{R}) du \quad (17)$$

Where E{ } is the expected-value operator.

In an embodiment, the computation of the 2D location estimate within the user floor location involves identifying visible access points and invisible access points associated with the user floor location only. In an embodiment, visible and invisible access points from other floors may also be used in computation of the 2D location estimate. More specifically, if a user receives RSSI measurements from access points from floors in the vicinity of the current user floor (thereby implying that the user is close to those access points), then such information may be utilized to not only restrict a size of the imaginary 2D grid on the user floor location to a smaller size to aid in 2D location estimation but also assist in improving the 2D location estimate.

Accordingly, in an embodiment, the location estimation module 204 is configured to identify access points from among the primary set of access points and the secondary set of access points associated with one or more floors in the vicinity of the user floor location. The location estimation module 204 is further configured to generate an imaginary 2D grid across the user floor location based on the identified access points. The location estimation module 204 is further configured to determine a 2D estimate of the user location based on a second set of RSSI measurements received from access points disposed in the user floor location and/or access points disposed in the vicinity of the user floor location. It is noted that the 2D location estimate is computed based on minimum mean square error (MMSE) algorithm configured to compute weighted probabilities of a user being located at various positions in the imaginary two-dimensional grid as explained with reference to equations (16) and (17). The usage of access points from other floors for restricting the size of 2D grid is further explained with reference to FIG. 10.

Figure 10:
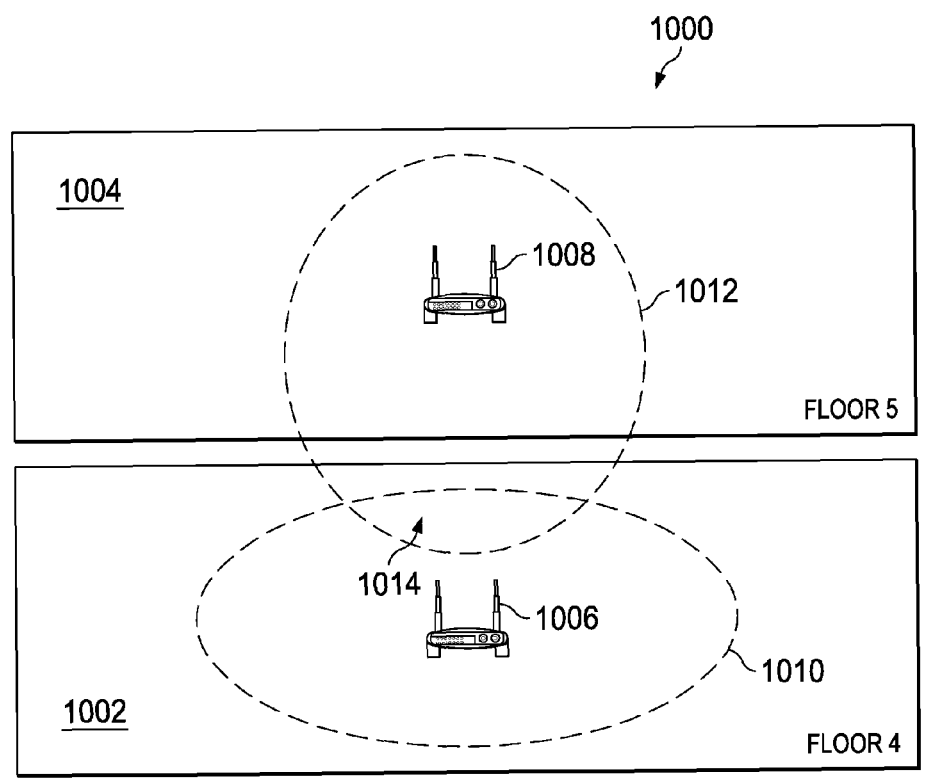
FIG. 10 depicts a perspective view of a seventh example multi-floor environment for illustrating an example usage of access points from floors in the vicinity of the user floor location in accordance with an embodiment.

FIG. 10 depicts a perspective view of a seventh example multi-floor environment 1000 (hereinafter referred to as multi-floor environment 1000) for illustrating an example usage of access points from floors in the vicinity of the user floor location in accordance with an embodiment. The multi-floor environment 1000 is depicted to include two floors—floor 1002 and floor 1004. The floor 1002 is depicted as 'FLOOR 4' and the floor 1004 is depicted as 'FLOOR 5' in FIG. 10. It is noted that the multi-floor environment 1000 is depicted to include two floors for illustration purposes and that the multi-floor environment 1000 may include fewer or more number of floors. In FIG. 10, the floor 1002 is depicted to include one access point 1006 and the floor 1004 is depicted to include one access point 1008 for illustration purposes. A user device associated with a user and including the system 200 of FIG. 2 may receive wireless signals from one or more access points, such as access points 1006 and 1008, in the multi-floor environment 1000. If floor 1002 is determined to be the user floor location then determining the 2D location estimate within the floor 1002 based on access points only within the floor 1002 may involve a high amount of uncertainty as the user location can be anywhere on the dotted circle 1010 in floor 1002. Similarly determining the 2D location estimate within floor 1002 based on the access point 1008 only may involve a high amount of uncertainty as the user can be anywhere on the dotted circle 1012 in floor 1002. However, if the wireless signals form access points 1008 in floor 1004 along with the wireless signal from access points 1006 in floor 1002 are used then the uncertainty reduces as user can be only in small intersection area 1014 of two dotted circles. Moreover, if the user receives wireless signals from access point 1008, then it is implied that the user is in the vicinity of the access point 1008 and accordingly a size of the two-dimensional grid can be reduced based on an intersection area 1014 of the two circles 1010 and 1012 as depicted in FIG. 10, leading to sizable reduction in computational complexity. In an embodiment, RSSI measurements corresponding to access points within the user floor location may be used in conjunction with the reduced 2D grid to compute the 2D location estimate. In another embodiment, RSSI measurements corresponding to access points in the vicinity of the user floor location may also be included in the 2D location estimation computation along with appropriate channel model parameters, such as floor attenuation factor as explained with reference to FIGS. 2 and 5. Accordingly, access points (both visible and invisible access points) from floors in the user floor location and those in the vicinity of the estimated user floor location can be utilized in determination of the 2D location estimate.

In an embodiment, a size of the imaginary 3D grid for determination of the user floor location (explained in reference to FIGS. 2 and 4) may be chosen to be fairly coarse, for example with a uniform grid step size of five meters, whereas a size of the imaginary 2D grid for determination of the 2D location estimate within the user floor location may be chosen to be relatively finer, for example with a uniform grid step size of one meter.

In an embodiment, a 3D estimate of user location may be estimated directly using the MMSE algorithm while precluding user floor location determination and subsequent determination of 2D location estimate within the determined user floor location using wireless access points. In such a scenario, an imaginary 3D grid including discrete grid points in vertical dimension and along the various floor locations may be generated and a probability of user location may be computed along each grid location across the floors using equations (6), (7), (8) and (17). However, a complexity of such a 3D user positioning technique is significantly higher than that the positioning technique explained with reference to FIGS. 2 to 10 and which includes separate user floor location determination based on wireless and pressure sensor measurements and subsequently computing a 2D location estimate within the determined user floor location. For example, for a scenario involving direct 3D user position estimation, a fine 3D grid needs to be constructed to get an accurate 3D user location estimate whereas in the positioning technique explained with reference to FIGS. 2 to 10, a coarse grid is used for user floor location determination and a fine grid is used for 2D location estimation, which substantially reduces the number of grid points and thereby number of computations to estimate overall 3D user position. Moreover, the modular approach of separately estimating user floor location and 2D location estimation enables combining floor information with pressure sensor measurements and 2D positioning with accelerometer and gyroscope sensors to further improve the 3D positioning accuracy.

In an alternate embodiment, a location estimation system, such as the location estimation system 200 may be conceived to include a transceiver module (such as the transceiver module 202) and a location estimation module (such as the location estimation module 204), where the transceiver module is configured to receive user floor location information along with associated uncertainty estimate from an external source and communicate the user floor location information to the location estimation module, which may then compute the 2D location estimate as explained above.

In an embodiment, the location estimation module 204 is configured to fuse the 2D location estimate along with associated fourth uncertainty estimate with at least one of a context of the user location, the user floor location and associated third uncertainty estimate and a map information associated with the multi-floor environment to determine a 3D estimate of the user location. The determination of the 3D estimate of the user location is explained with reference to FIG. 11.

Figure 11:
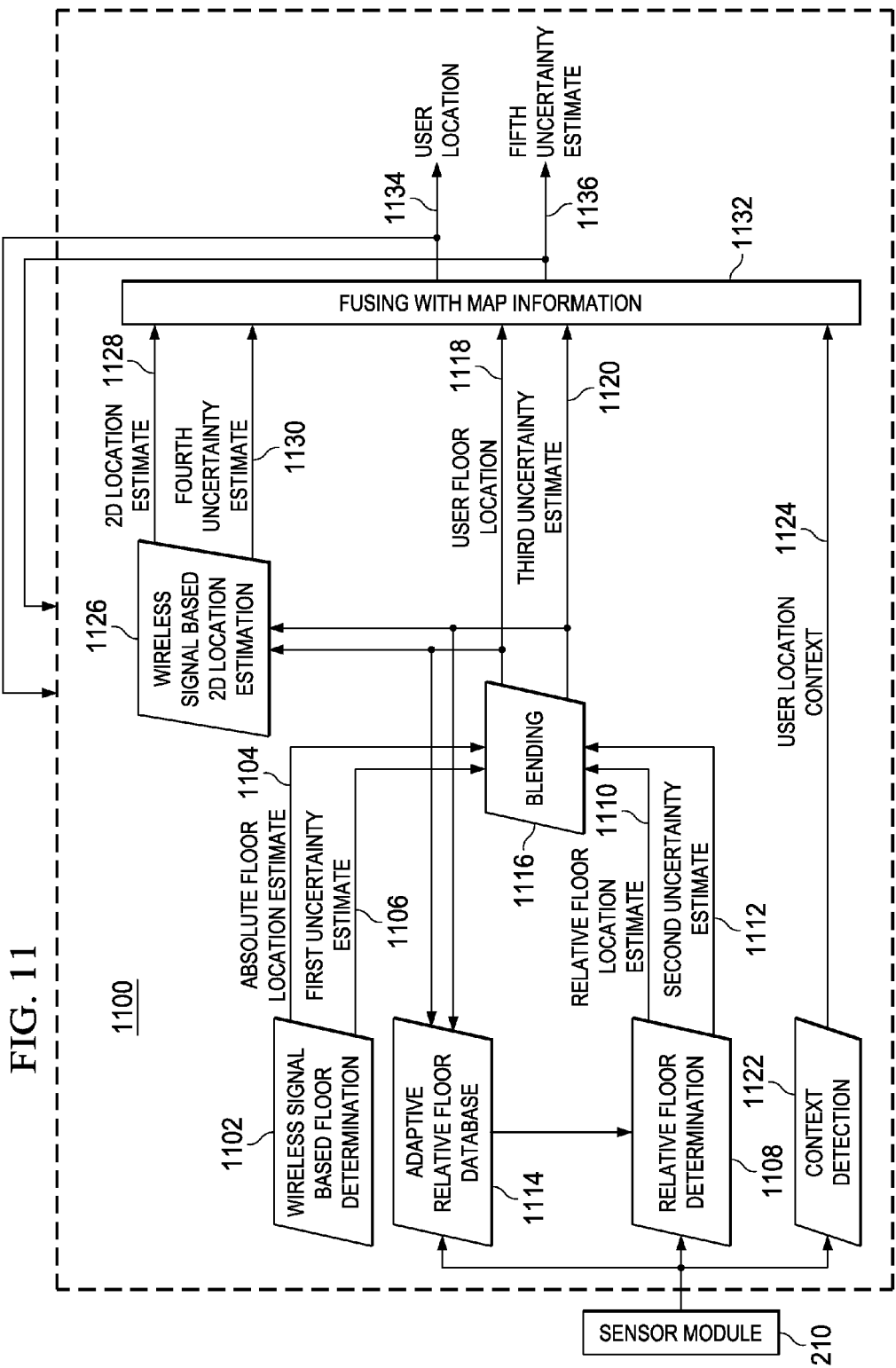
FIG. 11 depicts a block diagram of an example process flow for determination of user location in a multi-floor environment in accordance with an embodiment.

FIG. 11 illustrates a block diagram of an exemplary process flow 1100 for determination of user location in a multi-floor environment in accordance with an embodiment. The process flow 1100 may be performed by the system 200 of FIG. 2 for determination of the user location. More specifically, the location estimation module 204 of the system 200 may perform the process flow 1100. The block diagram further depicts the sensor module 210 of FIG. 2. The sensor module 210 is configured to provide sensor measurements, such as pressure sensor measurements and accelerometer measurements to the location estimation module 204.

At 1102 of the process flow 1100, a wireless signal based floor determination is performed as explained with reference to equations (1) to (8) to generate output of absolute floor location estimate 1104 along with corresponding first uncertainty estimate 1106. At 1108 of the process flow 1100, a relative floor determination is performed as explained with reference to FIG. 2 to generate output of the relative floor location estimate 1110 along with corresponding second uncertainty estimate 1112.

At 1116 of the process flow 1100, the absolute floor location estimate 1104 and the relative floor location estimate 1110 are blended, i.e. optimally weighed based on the first uncertainty estimate 1106 and the second uncertainty estimate 1112, for example in a Kalman filter based algorithm, to generate output of user floor location 1118 along with corresponding third uncertainty estimate 1120. At 1122 of the process flow 1100, a context of the user location in the multi-floor environment is detected as explained with reference to FIGS. 6, 7, 8 and 9 to determine user location context 1124 (from one among a staircase context, an elevator context, an escalator context and an on-floor context). At 1126 of the process flow 1100, a wireless signal based 2D location estimation is performed within the user floor location 1118 as explained with reference to FIGS. 2 and 10 to generate an output of 2D location estimate 1128 and fourth uncertainty estimate 1130.

As explained with reference to FIG. 2, the relative floor determination involves comparing an observed change in altitude measurements with a relative floor height value (based on the relative floor heights selected from a database) for determination of the relative floor location estimate 1110 and the second uncertainty estimate 1112. The database of relative floor heights (depicted as 'adaptive relative floor database' in FIG. 11) is dynamically adapted by the location estimation module 204 at 1114 by periodically updating corresponding values based on the determined user floor location 1118 and the associated third uncertainty 1120. The adaptation of the relative floor heights in the database is explained below in further detail:

As explained in reference with FIG. 2, in absence of a database comprising the relative floor heights of a multi-floor environment, a typical representative value of 4 meters for relative floor height may be chosen. However, the value of relative floor height may be subsequently updated to correspond to actual relative floor height of the floor the user is currently located in. For example, if the third uncertainty estimate 1120 of the user floor location 1118 is below a pre-determined acceptable level of threshold, then a current altitude measurement is tagged with the current user floor location 1118 (say floor 5). Similarly, at a later point in time, when the current user floor location 1118 is different (say floor 9) along with the associated third uncertainty estimate below a pre-determined acceptable level of threshold, then the current altitude measurement is tagged with the current user floor location 1118 (i.e. 9). The difference in the tagged altitude measurements between floors 9 and floor 5 is then divided by the number of floors in between (i.e. 4 floors) to determine the relative floor heights in the multi-floor building corresponding to all the floors from 6 to 9. The value of the floor height thresholds may be accordingly updated along with the updated relative floor heights. In general, if the third uncertainty $\sigma_k$ of the user floor location on floor 'i' at $k^{th}$ time epoch is below pre-defined acceptable level of threshold of uncertainty estimate denoted by 'Thresh' as depicted in equation (18):

$$f_k^B = i^{th} \text{ floor}, \text{Altitude}(i) = M_1 \text{ if } \sigma_k^B \leq \text{Thresh} \tag{18}$$

and, if the third uncertainty $\sigma_{k+T}$ of the user floor location on floor 'j' at k+T time epoch is below pre-defined acceptable level of threshold of uncertainty estimated denoted by 'Thresh' as depicted in equation (19):

$$f_{k+T}^B = j^{th} \text{ floor}, \text{Altitude}(j) = M_2 \text{ if } \sigma_{k+T}^B \leq \text{Thresh} \tag{19}$$

then the relative floor height is computed as depicted in equation (20) as depicted below:

$$\text{Relative floor height}(z) = \frac{|M_2 - M_1|}{|i - j|} \text{ for } \min(i, j) < z \leq \max(i, j) \tag{20}$$

In an embodiment, the values of relative floor heights are subsequently adapted only if the user floor locations with better uncertainty estimates than those utilized before in determining the relative floor height (z) are encountered during user floor location determination.

At 1132 of the process flow 1100, the user floor location 1118 along with the third uncertainty estimate 1120, the user location context 1124 and the 2D location estimate 1128 along with the fourth uncertainty estimate 1130 is fused with map information of the multi-floor environment to generate output of 3D estimate of the user location 1134 and the fifth uncertainty estimate 1136. In an embodiment, the map information of the multi-floor environment may be received by the transceiver module 202 from a NFC/WiFi/Bluetooth terminal disposed at an entrance of the multi-floor environment and subsequently passed onto the location estimation module 204 by the transceiver module 202. In an embodiment, values of the plurality of channel model parameters used for computation of both the absolute floor location estimate 1104 and the 2D location estimate 1128 are iteratively adapted based on the user location 1134 and the fifth uncertainty estimate 1136. The adaptation of the values of the plurality of channel model parameters is explained with reference to FIG. 12.

Figure 12:
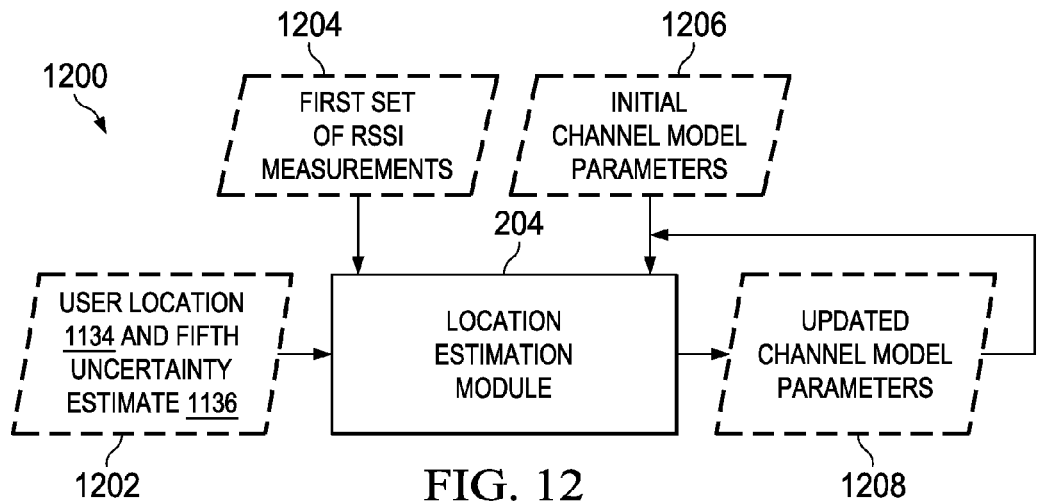
FIG. 12 depicts a block diagram schematic illustrating an exemplary adapting of values of a plurality of channel model parameters in accordance with an embodiment.

FIG. 12 depicts a block diagram schematic 1200 illustrating an exemplary adapting of values of a plurality of channel model parameters in accordance with an embodiment. The channel model parameters, as depicted in equation (8) includes log-normal shadowing model parameters and parameters accounting for signal attenuation across floors in the multi-floor environment. More specifically, the channel model parameters include log-normal shadowing model parameters, such as a reference RSSI and a path loss coefficient, and, a signal attenuation parameter, such as a floor attenuation factor (explained with reference to FIG. 5). The channel model parameters differ from one access point to another and sometimes even for the same access point over a period of time. As a result, during computation of the user floor location and the user location, coarse estimates of the channel model parameters are selected for each access point (for example, by using offline training data). Upon estimating the user floor location and the user location, the channel model parameters are adapted to get the right channel model parameters, which emulate the environment.

The 3D estimate of the user location 1134 and the fifth uncertainty estimate 1136 (explained in reference to process flow 1100 in FIG. 11) are generated as output based on a set of initial channel model parameters and first set of RSSI measurements (computed from the received wireless signals from one or more access points in the multi-floor environment). The initial channel model parameters and the first set of RSSI measurements are stored in the memory module 206. Upon generation of the 3D estimate of the user location, the user location 1134 and the fifth uncertainty estimate 1136 are fed back to the location estimation module 204 as input 1202. Further, the initial channel model parameters and the first set of RSSI measurements are further retrieved from the memory module 206 and provisioned as input 1204 and 1206, respectively, to the location estimation module 204. The location estimation module 204 is configured to adapt the values of the plurality of channel model parameters, i.e. generate updated channel model parameters 1208 at time 't', which are then utilized to estimate user floor location and user 2D location estimate at time 't+1'. The updation of the channel model parameters may be performed as explained below:

In an embodiment, the reference RSSI is adapted for the visible access points, which correspond to determined user floor location. For example, if (1) a number of total grid points in the MMSE search procedure for 2D positioning is N (2) $P_k$ denotes the probability of being at the $k^{th}$ grid point (3) a distance between the $k^{th}$ grid point and the $j^{th}$ access point is denoted by $d_{jk}$ and (4) the RSSI measurement of the $j^{th}$ AP is denoted by $R_j$, then the weighted difference is computed as depicted in equation (21):

$$q_j = \sum_k \left( R_j - 10 n \log_{10}(d_0 / d_{jk}) - R_0^{(j)} \right) P_k \tag{21}$$

Where the summation is over the grid points inside a particular region. The reference power of the $j^{th}$ access point is updated from $R_0^{(j)}$ to $R_0^{(j)} + q_j$. Further, the updation value, i.e. $q_j$ of the reference RSSI may be smoothened before being utilized for updating the reference RSSI. The above adaptation process is repeated for each visible access point from the determined user floor location at each scan. In an example embodiment, a value of the floor attenuation factor is adapted to zero value for the determined user floor location access points and its value is adapted only for other floor access points in the vicinity of the determined user floor location. For example, if (1) a number of total grid points in the MMSE search procedure for 2D positioning is N (2) $P_k$ denotes the probability of being at the $k^{th}$ grid point (3) a distance between the $k^{th}$ grid point and the $j^{th}$ access point from other floor is denoted by $d_{jk}$ and (4) the RSSI measurement of the $j^{th}$ AP is denoted by $R_j$, then a parameter $\text{Delta}_j$ is computed as depicted in equation (22):

$$\text{Delta}_j = \sum_k \left( R_j - 10 n \log_{10}(d_0 / d_{jk}) - R_0^{(j)} \right) P_k \tag{22}$$

where the summation is over the grid points inside a particular region. The above process is repeated for each visible access point from the other floors at each scan and values of delta are averaged for access points, which are from same floor to determine the FAF of all the floors.

In an embodiment, the above process may be limited to access points, which are disposed in a pre-defined number of floors above and below the determined user floor location. In an embodiment, the parameter Delta$_j$ is treated symmetrically across floors at uniform distance from the determined user floor location. For example, if wireless signals are received from access points from floors 1, 2, 3, 4 and 5 and determined user floor location is $2^{nd}$ floor, then the FAF of $3^{rd}$ floor is estimated to same as the FAF of $1^{st}$ floor. Since FAF for the $1^{st}$ and $3^{rd}$ floor is treated symmetrically, therefore the delta's of each visible access points from both floors is averaged to get an estimate the FAF. For example, if the FAF for the $1^{st}$ and $3^{rd}$ floor is 'x' dB, then the FAF of $4^{th}$ floor access point on the $2^{nd}$ floor is to be estimated as 2x and for $5^{th}$ floor access points is 3x.

In an embodiment, a value of the path loss coefficient is adapted based on the determined user location, first set of RSSI measurements and adapted values of the reference RSSI and the FAF. In an embodiment, the value of the path loss coefficient is adapted based on the equation (23) as depicted below:

$$R(d,f) = R_0 + 10n \log_{10}(d_0/d) - \Delta(f, f_0) \quad (23)$$

where the constant $R_0$ includes the adapted reference RSSI at the reference distance $d_0$ for an access point, the distance d is the distance between the determined user location and an access point location. The adaptation of the path loss coefficient includes updating a value of the slope n according to the observed RSSI and the determined user location. The above computation may be repeated for each visible access point and for each wireless scan. In an embodiment, a value of the slope is updated based on a standard Recursive Least Square (RLS) algorithm.

As explained, the system 200 may be included with a user device, such as a mobile phone, a Smartphone, a tablet PC, a laptop and the like. The system 200 may include components for performing various functions, which are not depicted herein. For example, the system 200 may additionally include components, such as an input unit (e.g., a touch screen panel or a keyboard/keypad), a video display unit (e.g., liquid crystal display (LCD), a cathode ray tube (CRT), and the like), a cursor control device (e.g., a mouse), a drive unit (e.g., a disk drive), a signal generation unit (e.g., a speaker) and/or a network interface unit. The drive unit includes a machine-readable medium upon which is stored one or more sets of instructions (e.g., software) embodying one or more of the methodologies and/or functions described herein. In an embodiment, the software resides, either completely or partially, within the memory module 206, and/or within the location estimation module 204 during the execution thereof by the system 200, such that the location estimation module 204 and memory module 206 also constitute a machine-readable media. The software may further be transmitted and/or received over a network via the network interface unit.

The term "machine-readable medium" may be construed, for example, to include a single medium and/or multiple media (e.g., a centralized and/or distributed database, and/or associated caches and servers) that store the one or more sets of instructions. Moreover, the term "machine-readable medium" may be construed, for example, to include any medium that is capable of storing, encoding and/or carrying a set of instructions for execution by the system 200 and that cause the system 200 to perform any one or more of the methodologies of the various embodiments. Furthermore, the term "machine-readable medium" may be construed to include, but shall not be limited to, solid-state memories, optical and magnetic media, and carrier wave signals. The foregoing notwithstanding, it is noted that the present technology is not limited to any particular definition of "machine-readable medium". A location estimation method for estimating user location in a multi-floor environment is explained with reference to FIG. 13.

Figure 13:
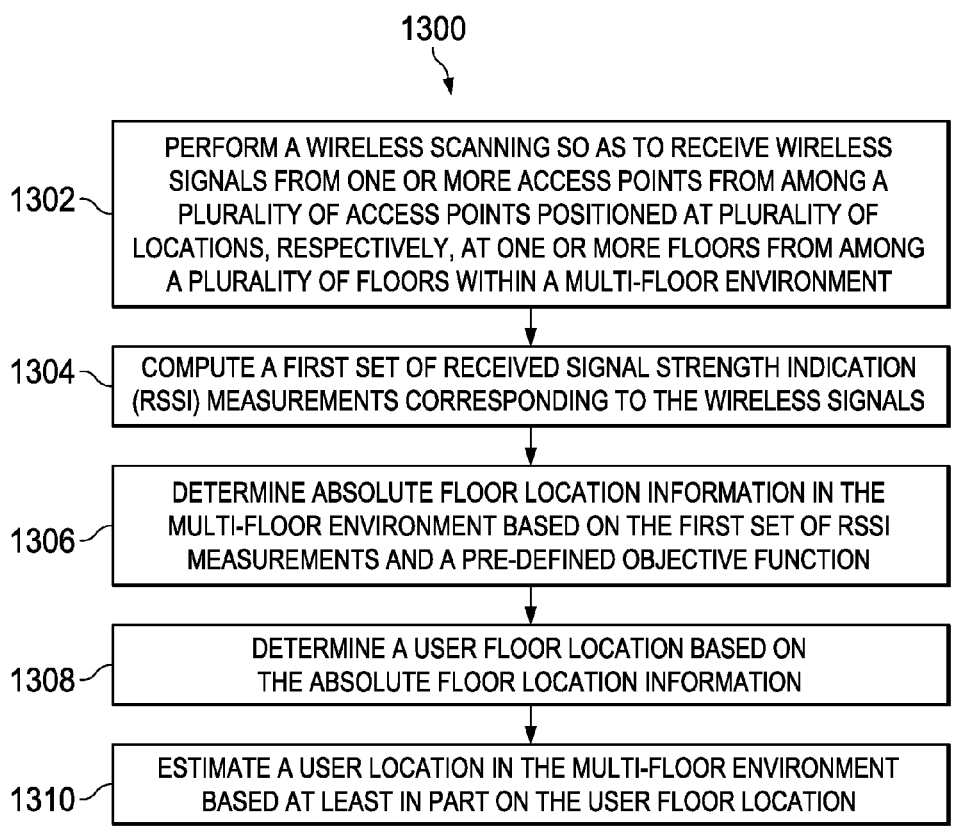
FIG. 13 illustrates a flow diagram of a first example location estimation method in accordance with an example embodiment.

FIG. 13 illustrates a flow diagram of a first example location estimation method 1300 in accordance with an example embodiment. The method 1300 depicted in the flow diagram may be executed by, for example, the system 200 explained with reference to FIGS. 2 to 12. Operations of the flowchart, and combinations of operation in the flowchart, may be implemented by, for example, hardware, firmware, a processor, circuitry and/or a different device associated with the execution of software that includes one or more computer program instructions. The operations of the method 1300 are described herein with help of the system 200. However, the operations of the method can be described and/or practiced by using a system other than the system 200. The method 1300 starts at operation 1302.

At operation 1302, a wireless scanning is performed (for example, by the transceiver module 202 of system 200) for receiving wireless signals from one or more access points from among a plurality of access points positioned at plurality of locations, respectively, at one or more floors from among a plurality of floors within the multi-floor environment. At operation 1304, a first set of RSSI measurements corresponding to the wireless signals is computed (for example, by the location estimation module 204 of FIG. 2).

At operation 1306, absolute floor location information in the multi-floor environment is determined (for example, by the location estimation module 204) based on the first set of RSSI measurements and a pre-defined objective function. In an embodiment, the pre-defined objective function is configured to maximize a probability of a user being located at a floor from among the plurality of floors in the multi-floor environment so as to receive the wireless signals corresponding to the first set of RSSI measurements. In an embodiment, the pre-defined objective function is maximum a posteriori probability distribution function. In an embodiment, the probability is estimated based on a three-dimensional channel model comprising a plurality of channel model parameters. The plurality of channel model parameters includes at least one of log-normal shadowing model parameters and parameters accounting for signal attenuation across floors in the multi-floor environment. In an embodiment, the absolute floor location information includes an absolute floor location estimate and a first uncertainty estimate associated with the absolute floor location estimate. The determination of the absolute floor location information may be performed as explained with reference to (1) to (8).

At operation 1308, a user floor location is computed based on the absolute floor location information. In an embodiment, relative floor location information is determined based on pressure sensor measurements received corresponding to user movements in the multi-floor environment. The relative floor location information includes a relative floor location estimate and a second uncertainty estimate associated with the relative floor location estimate. In an embodiment, the relative user floor location estimate (i.e. a number of floors traversed by a user) with the corresponding uncertainty in the estimate is computed by comparing a change in altitude associated with the user movements to a relative floor height value. In an embodiment, a change in the altitude measurements is compared against the relative floor height value corresponding to relative heights of the different floors in the multi-floor environment to determine a number of floors the user has traversed. In an embodiment, a user floor location is determined along with a third uncertainty estimate by optimally weighing the initial floor location estimate and the relative floor location estimate based on the first uncertainty estimate and the second uncertainty estimate in a Kalman filter based algorithm as explained with reference to equations (9) to (15).

At operation 1310, a user location in the multi-floor environment is estimated based at least in part on the user floor location. In an embodiment, a context of the user location is computed based on accelerometer measurements and the pressure sensor measurements as explained with reference to FIGS. 6 to 9. In addition to determination of context of the user location, a 2D location estimate within the absolute floor location estimate is computed along with associated fourth uncertainty measure as explained with reference to equations (16) and (17). In an embodiment, the 2D location estimate along with associated fourth uncertainty estimate is fused (for example, by the location estimation module 204) with at least one of a context of the user location (for example one of the staircase, escalator, elevator or on-floor context), the user floor location and associated third uncertainty estimate and a map information associated with the multi-floor environment to determine a 3D estimate of the user location. Another method of estimating user location in a multi-floor environment is explained with reference to FIG. 14.

Figure 14B:
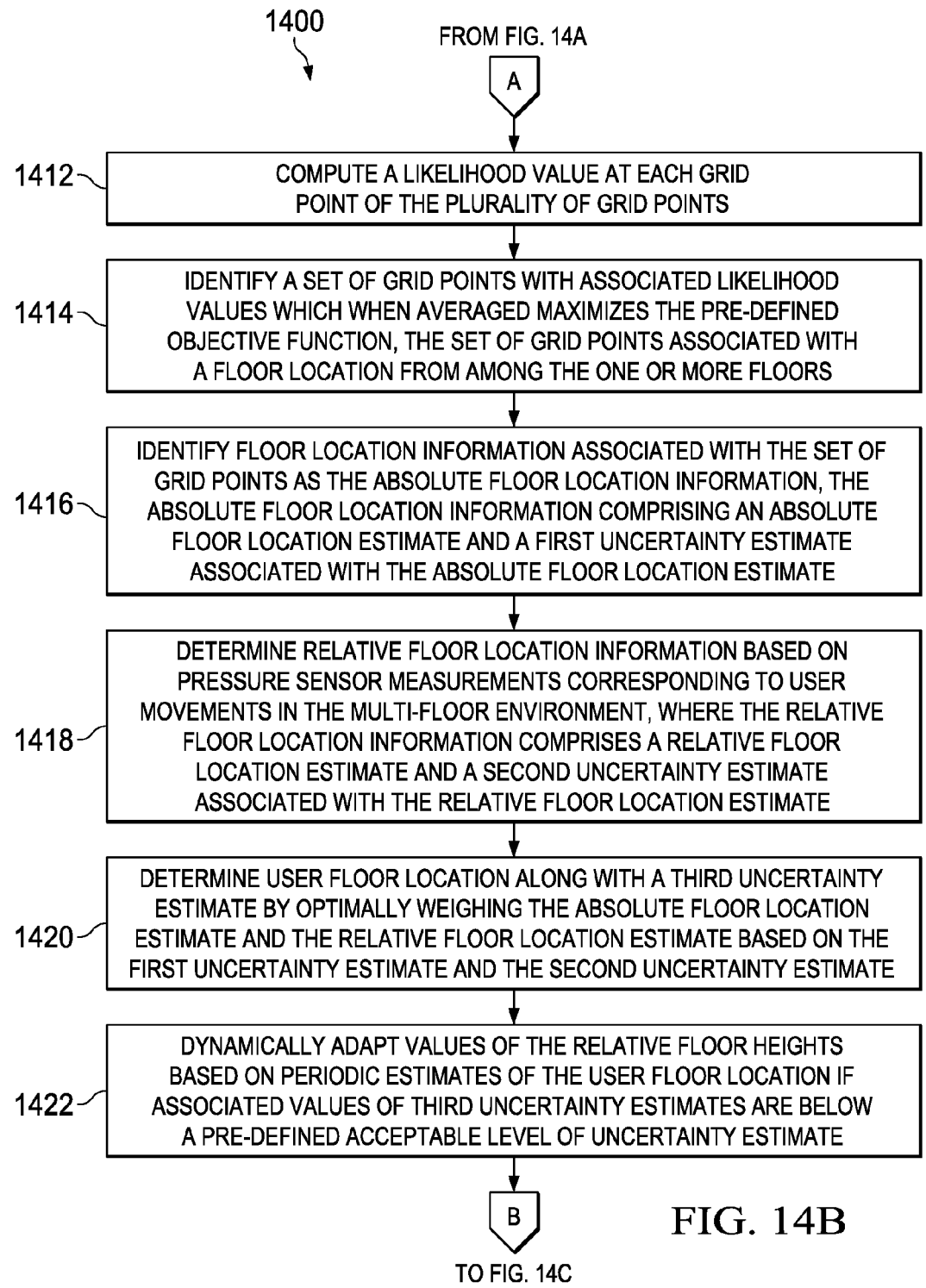
Figure 14C:
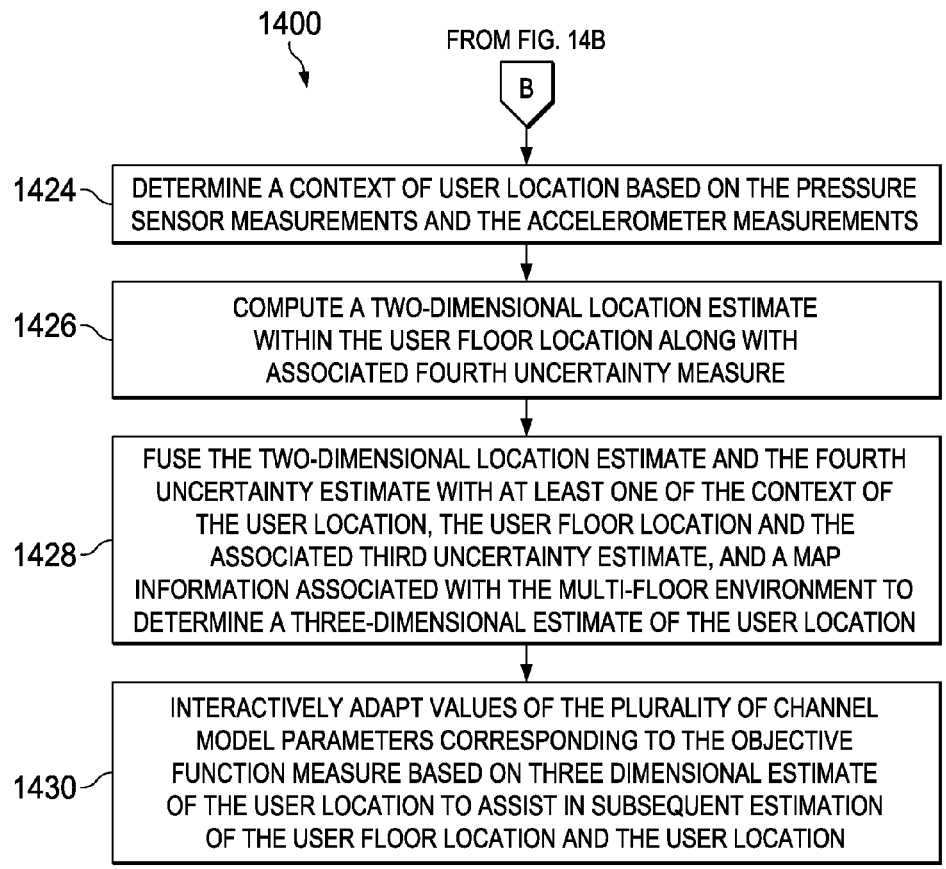

FIGS. 14A, 14B and 14C illustrate a flow diagram of a second example location estimation method 1400 in accordance with an example embodiment. The method 1400 depicted in the flow diagram may be executed by, for example, the system 200 explained with reference to FIGS. 2 to 12. Operations of the flowchart, and combinations of operation in the flowchart, may be implemented by, for example, hardware, firmware, a processor, circuitry and/or a different device associated with the execution of software that includes one or more computer program instructions. The operations of the method 1400 are described herein with help of the system 200. However, the operations of the method can be described and/or practiced by using a system other than the system 200. The method 1400 starts at operation 1402.

At operation 1402, wireless scanning is performed (for example, by the transceiver module 202 of system 200) so as to receive wireless signals from one or more access points from among a plurality of access points positioned at plurality of locations, respectively, at one or more floors from among a plurality of floors within the multi-floor environment. At operation 1404, a first set of received signal strength indication (RSSI) measurements corresponding to the wireless signals is computed (for example, by the location estimation module 204 of FIG. 2). At operation 1406, a primary set of access points (i.e. visible access points and a secondary set of access points (i.e. invisible access points) are identified (for example, by the location estimation module 204 of FIG. 2) from among the plurality of access points subsequent to performing wireless scanning. The determination of the visible access points and the invisible access points may be performed as explained with reference to FIGS. 2 and 3.

At operation 1408, a geometric measure is computed based on locations associated with each access point from among the identified primary set of access points and the secondary set of access points. In an embodiment, the geometric measure is one of a centroid measure and a RSSI weighted centroid measure. At operation 1410, an imaginary 3D grid is generated around the geometric measure and is configured to extend across one or more floors in the multi-floor environment. The 3D grid includes a plurality of grid points. At operation 1412, a likelihood value is computed (for example, by the location estimation module 204 of FIG. 2) at each grid point of the plurality of grid points. At operation 1414, a set of grid points associated with a floor location from among the one or more floors and associated with likelihood values which when averaged maximizes the pre-defined objective function is identified (for example by the location estimation module 204). In an embodiment, the pre-defined objective function is maximum a posteriori (MAP) probability distribution function configured to maximize a probability of a user being located at a floor from among the plurality of floors in the multi-floor environment so as to receive the first set of RSSI measurements. The value of the pre-defined objective function may be computed as explained with reference to equations (1) to (7). In an embodiment, the probability is estimated based on a 3D channel model comprising a plurality of channel model parameters. In an embodiment, the plurality of channel model parameters include at least one of log-normal shadowing model parameters and a parameter accounting for signal attenuation across floors in the multi-floor environment. In an embodiment, the log-normal shadowing model parameters may include a reference RSSI and a path loss coefficient. In an embodiment, an example of the parameter accounting for signal attenuation across floors in the multi-floor environment may be a measure by which an RSSI measurement of an access point in an adjacent floor is attenuated as compared to the RSSI measurement of an access point in a same floor. In an embodiment, the attenuation is termed as 'Floor Attenuation Factor'.

At operation 1416, a floor location information associated with the set of grid points is identified as the absolute floor location information. For example, if the imaginary 3D grid extends across floors 2, 3 and 4 and the pre-defined objective function is computed for grid points across the floors 2, 3 and 4, and it is determined that the average value of the likelihood values for a set of grid points corresponding to floor 3 maximizes the pre-defined objective function, then floor information associated with floor 3 is determined to the absolute floor location information. In an embodiment, the absolute floor location information includes an absolute floor location estimate and a first uncertainty estimate associated with the absolute floor location estimate.

At operation 1418, relative floor location information is determined based on pressure sensor measurements received corresponding to user movements in the multi-floor environment. The relative floor location information includes a relative floor location estimate and a second uncertainty estimate associated with the relative floor location estimate. In an embodiment, the relative user floor location estimate (i.e. a number of floors traversed by a user) with the corresponding uncertainty in the estimate is computed by comparing the change in altitude associated with the user movements to a relative floor height value corresponding to relative heights of the different floors in the multi-floor environment to determine the number of floors the user has traversed.

At operation 1420, a user floor location is determined based on at least one of the absolute floor location information and the relative floor location information. In an embodiment, a user floor location is determined along with a third uncertainty estimate by optimally weighing the initial floor location estimate and the relative floor location estimate based on the first uncertainty estimate and the second uncertainty estimate, for example in a Kalman filter based algorithm, as explained with reference to equations (11) to (17). At operation 1422, values of the relative floor heights are dynamically adapted based on periodic estimates of the user floor location if associated values of third uncertainty estimates are below a pre-defined acceptable level of uncertainty estimate. The dynamic updation of the relative floor height value may be performed as explained in reference with FIG. 11.

At operation 1424, a context of the user location is computed based on accelerometer measurements and the pressure sensor measurements as explained with reference to FIGS. 6 to 9. In addition to determination of context of the user location, at operation 1426, a 2D location estimate within the determined user floor location is computed along with associated fourth uncertainty measure as explained with reference to equations (6), (7), (8) and (17). At operation 1428, the 2D location estimate along with associated fourth uncertainty estimate is fused (or combined for example, by the location estimation module 204) with at least one of a context of the user location, the user floor location and associated third uncertainty estimate and a map information associated with the multi-floor environment to determine a 3D estimate the user location. At operation 1430, values of the plurality of channel model parameters corresponding to the pre-defined objective function are iteratively adapted based on the 3D estimate of the user location to assist in subsequent estimation of the user floor location and the user location.

Figure 15:
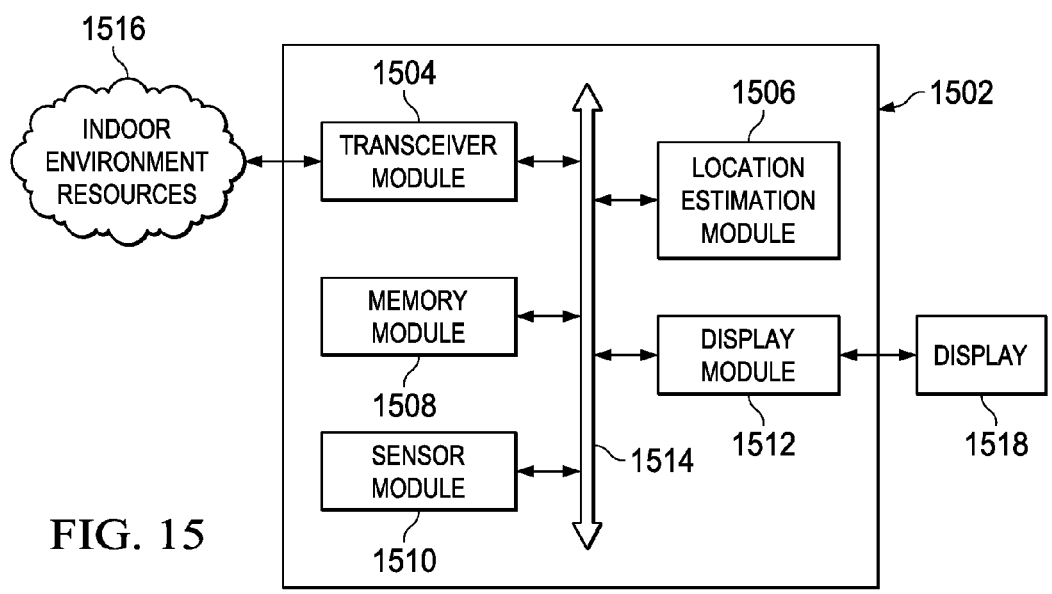
FIG. 15 is a block diagram of an example integrated circuit configured to estimate user location in a multi-floor environment in accordance with an embodiment.

FIG. 15 is a block diagram of an example integrated circuit 1502 configured to estimate user location in a multi-floor environment in accordance with an embodiment. In an embodiment, the system 200 of FIG. 2 is embodied at least partially in the form of the integrated circuit 1502. The integrated circuit 1502 includes a transceiver module 1504, a location estimation module 1506, a memory module 1508, a sensor module 1510 and a display module 1512. The transceiver module 1504, the location estimation module 1506, the memory module 1508, the sensor module 1510 and the display module 1512 are communicatively associated or coupled with each other using data path 1514. As such, it is noted that at least some of the components described below in connection with the integrated circuit 1502 may be optional, and, thus, in an example embodiment the integrated circuit 1502 includes more, less or different components than those described in connection with the example embodiment of FIG. 15. In an embodiment, the integrated circuit 1502 may include only the transceiver module 1504, the location estimation module 1506 and the sensor module 1510.

The transceiver module 1504 is configured to communicative with indoor environment resources 1516 and is configured to receive information, such as wireless signals, database of access points from among the plurality of access points, database of relative floor heights (for relative floor location information determination) and the like. Examples of the indoor environment resources 1516 include, but are not limited to (1) access points (2) Bluetooth terminals (3) Near field Communication (NFC) terminals and the like. In an embodiment, the transceiver module 1504 may include an antenna and/or network connectors configured to couple with or connect to wired networks (for example, local area networks (LANs)) and wireless networks (for example, cellular networks), or a combination thereof (for example, the Internet).

The memory module 1508 is configured to store the RSSI measurements corresponding to received wireless signals, user floor location along with corresponding altitude measurements and the like. In an embodiment, the memory module 1508 is substantially similar to the memory module 206 of system 200 of FIG. 2. The memory module 1508 is configured to perform functions as discussed in FIG. 2 with reference to memory module 206, which are not repeated herein for the sake of brevity. Examples of memory module 1508 include, but are not limited to, RAM, dual port RAM, SDRAM, DDR SDRAM, and the like.

The location estimation module 1506 is configured to estimate user location in the multi-floor environment. In an embodiment, the location estimation module 1506 is configured to estimate user location and provide the user location to the display module 1512 for display purposes or to memory module 1508 for storage purposes. In an embodiment, the location estimation module 1506 is substantially similar to the location estimation module 204 of system 200 of FIG. 2. The location estimation module 1506 is configured to perform functions as discussed in FIG. 2, which are not repeated herein for the sake of brevity.

The sensor module 1510 is configured to include sensors, such as a pressure sensor, accelerometer and the like. The sensor module 1510 is configured to provide pressure sensor measurements and accelerometer measurements to the location estimation module 1506 for facilitating estimation of the user location in the multi-floor environment. In an embodiment, the sensor module 1510 is substantially similar to the sensor module 210 of FIG. 2. The sensor module 1510 is configured to perform functions as discussed in FIG. 2, which are not repeated herein for the sake of brevity.

The display module 1512 is configured to facilitate a display the estimated user location on display 1518 (aided with or without map of the indoor environment). The display 1518 is facilitated, for example, in response to a user input received using a user interface (not shown in FIG. 7). Examples of display 1518 include a liquid crystal display (LCD) panel, a plasma display panel, a field emission display and the like.

In an embodiment the integrated circuit 1502 is an application processor chip. In an embodiment, the integrated circuit 1502 is a part of a particular or shared processor chip that is embedded within a multimedia system. Examples of the multimedia system include, but are not limited to, (1) multimedia devices, such as, for example, cellular phones, digital video cameras and digital camcorders and (2) data processing devices, such as, for example, personal computers, laptops and personal digital assistants.

Without in any way limiting the scope, interpretation, or application of the claims appearing below, advantages of one or more of the example embodiments disclosed herein include estimating user location in the multi-floor environment, which includes providing floor location on which user is currently navigating in addition to providing the two-dimensional estimate of the user location. In applications like search and rescue, floor estimation accuracy is more critical than 2D positioning accuracy. Accordingly, floor determination enables comprehensive three-dimensional indoor positioning solution. Moreover, the modular approach of separately estimating user floor location and 2D estimation of user location enables combining floor information with pressure sensor measurements and 2D positioning with accelerometer and gyroscope sensors to further improve the 3D positioning accuracy. Moreover, such estimation incorporates information related to access points from which wireless signals are not received (i.e. invisible access points), thereby improving positioning accuracy as explained with reference to FIG. 3. Moreover, an overall positioning accuracy of the user location is improved by incorporating measurements from sensors, such as pressure sensor and accelerometers, which are especially useful in outage areas of the multi-floor environment, such as areas including or in the vicinity of an elevator or a staircase, where an access point visibility may be poor, unreliable or non-existent.

Although the present technology has been described with reference to specific example embodiments, it is noted that various modifications and changes may be made to these embodiments without departing from the broad spirit and scope of the present technology. For example, the various devices, modules, analyzers, generators, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 200, the transceiver module 202, the location estimation module 204 and the memory module 206 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the example embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these example embodiments, it is noted that certain modifications, variations, and alternative constructions may be apparent and well within the spirit and scope of the technology. Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A location estimation method comprising:
performing a wireless scanning so as to receive wireless signals from one or more wireless access point devices from among a plurality of access point devices positioned at plurality of locations, respectively, at one or more floors from among a plurality of floors within a multi-floor building;
computing a first set of received signal strength indication (RSSI) measurements from the received wireless signals;
determining absolute floor location information in the multi-floor building based on the first set of RSSI measurements and a pre-defined objective function, the pre-defined objective function maximizing a probability of a user being located at a floor from among the plurality of floors so as to receive the wireless signals from the first set of RSSI measurements, in which the probability is estimated based on a three-dimensional channel model including a plurality of channel model parameters;
determining a relative floor location estimate based on information from a sensor;
determining a user floor location based on the absolute floor location information;
estimating the user location in the multi-floor building based at least in part on the user floor location and the relative floor location estimate using a Kalman filter iteratively performing a time and measurement update;
identifying, subsequent to performing the wireless scanning, a primary set of access point devices and a secondary set of access point devices from among the plurality of access point devices, in which the primary set of access point devices correspond to those one or more access point devices from which wireless signals are received during the wireless scanning, and, the secondary set of access point devices correspond to those access point devices whose presence has been ascertained previous to the wireless scanning and from which wireless signals are not received during the wireless scanning;

the method including computing a geometric measure based on locations associated with access point devices from among the identified primary set of access point devices and the secondary set of access point devices;

generating an imaginary three-dimensional grid based on the geometric measure, the three-dimensional grid extending across one or more floors in the multi-floor building and including a plurality of grid points;

computing a likelihood value at each grid point device of the plurality of grid point devices;

identifying a set of grid point devices with associated likelihood values which when averaged maximizes the pre-defined objective function, the set of grid point devices associated with a floor location from among the one or more floors; and identifying floor location information associated with the set of grid point devices as the absolute floor location information, the absolute floor location information including an absolute floor location estimate and a first uncertainty estimate associated with the absolute floor location estimate.

2. The method of claim 1, in which the plurality of channel model parameters includes at least one of log-normal shadowing model parameters and parameters accounting for signal attenuation across floors in the multi-floor building.

3. The method of claim 1, in which the determining relative floor location information is based on pressure sensor measurements corresponding to user movements in the multi-floor environment, in which the relative floor location information includes a relative floor location estimate and a second uncertainty estimate associated with the relative floor location estimate, the relative user floor location estimate computed by comparing a change in altitude associated with the user movements to a relative floor height value.

4. The method of claim 3, wherein the user floor location is determined along with a third uncertainty estimate by optimally weighing the absolute floor location estimate and the relative floor location estimate based on the first uncertainty estimate and the second uncertainty estimate.

5. The method of claim 4, wherein the relative floor height value is dynamically adapted based on periodic estimates of the user floor location if associated values of third uncertainty estimates are below a pre-defined acceptable level of uncertainty estimate.

6. The method of claim 4, including:

detecting a presence of step movements associated with the user movements based on accelerometer measurements received from an accelerometer;

determining a vertical motion indication and a vertical velocity information based on the pressure sensor measurements; and computing a context of the user location based on the step movements detection and the determined vertical motion indication and the vertical velocity information, wherein the context of the user location is one of a staircase context, an elevator context, an escalator context and an on-floor context.

7. The method of claim 6, wherein estimating the user location comprises:

identifying access point devices from among the primary set of access point devices and the secondary set of access point devices associated with one or more floors in the vicinity of the user floor location;

generating an imaginary two-dimensional grid across the user floor location based on the identified access point devices; and computing a two-dimensional location estimate within the user floor location along with associated fourth uncertainty measure based on a second set of RSSI measurements corresponding to wireless signals received from at least one of access point devices positioned in the user floor location and access points positioned in the vicinity of the user floor location, in which the two-dimensional location estimate is computed based on minimum mean square error (MMSE) algorithm configured to compute weighted probabilities of a user being located at various positions in the imaginary two-dimensional grid.

8. The method of claim 7, including fusing the two-dimensional location estimate and the fourth uncertainty estimate with at least one of the context of the user location, the user floor location and the associated third uncertainty estimate, and a map information associated with the multi-floor building to determine a three-dimensional estimate of the user location.

9. The method of claim 8, in which values of the plurality of channel model parameters are iteratively adapted based on the user floor location and the user location to assist in subsequent estimation of the user floor location and the user location.

10. A location estimation system comprising:

transceiver circuitry configured to perform a wireless scanning so as to receive wireless signals from one or more access point devices from among a plurality of access point devices positioned at plurality of locations, respectively, at one or more floors from among a plurality of floors within a multi-floor building; and location estimation circuitry communicatively associated with the transceiver circuitry and configured to:

compute a first set of received signal strength indication (RSSI) measurements corresponding to the wireless signals;

determine absolute floor location information in the multi-floor building based on the first set of RSSI measurements and a pre-defined objective function, the pre-defined objective function configured to maximize a probability of a user being located at a floor from among the plurality of floors so as to receive the wireless signals corresponding to the first set of RSSI measurements, in which the probability is estimated based on a three-dimensional channel model including a plurality of channel model parameters;

determine a relative floor location estimate based on information from a sensor;

determine a user floor location based on the absolute floor location information;

estimate the user location in the multi-floor environment based at least in part on the user floor location and the relative floor location estimate using a Kalman filter iteratively performing a time and measurement update;

identify, subsequent to performing the wireless scanning, a primary set of access point devices and a secondary set of access point devices from among the plurality of access point devices, in which the primary set of access point devices correspond to those one or more access point devices from which wireless signals are received during the wireless scanning, and, the secondary set of access point devices correspond to those access point devices whose presence has been ascertained previous to the wireless scanning and from which wireless signals are not received during the wireless scanning compute a geometric measure based on locations associated with access point devices from among the identified primary set of access point devices and the secondary set of access point devices;

generate an imaginary three-dimensional grid based on the geometric measure, the three-dimensional grid extending across one or more floors in the multi-floor building and including a plurality of grid points;

compute a likelihood value at each grid point of the plurality of grid points;

identify a set of grid points with associated likelihood values which when averaged maximizes the pre-defined objective function, the set of grid points associated with a floor location from among the one or more floors; and identify floor location information associated with the set of grid points as the absolute floor location information, the absolute floor location information including an absolute floor location estimate and a first uncertainty estimate associated with the absolute floor location estimate.

11. The system of claim 10, in which the location estimation circuitry is further configured to:

determine relative floor location information based on pressure sensor measurements corresponding to user movements in the multi-floor environment, in which the relative floor location information includes a relative floor location estimate and a second uncertainty estimate associated with the relative floor location estimate, the relative user floor location estimate computed by comparing a change in altitude associated with the user movements to a relative floor height value.

12. The system of claim 11, in which the user floor location is determined along with a third uncertainty estimate by optimally weighing the absolute floor location estimate and the relative floor location estimate based on the first uncertainty estimate and the second uncertainty estimate.

13. The system of claim 12, in which the location estimation circuitry is further configured to:

detect a presence of step movements associated with the user movements based on accelerometer measurements received from an accelerometer;

determine a vertical motion indication and a vertical velocity information based on the pressure sensor measurements; and compute a context of the user location based on the step movements detection and the determined vertical motion indication and the vertical velocity information, in which the context of the user location is one of a staircase context, an elevator context, an escalator context and an on-floor context.

14. The system of claim 13, in which estimating the user location includes:

identifying access point devices from among the primary set of access point devices and the secondary set of access point devices associated with one or more floors in the vicinity of the user floor location;

generating an imaginary two-dimensional grid across the user floor location based on the identified access point devices;

computing a two-dimensional location estimate within the user floor location along with associated fourth uncertainty measure based on a second set of RSSI measurements corresponding to wireless signals received from at least one of access point devices positioned in the user floor location and access point devices positioned in the vicinity of the user floor location, wherein the two-dimensional location estimate is computed based on minimum mean square error (MMSE) algorithm configured to computed weighted probabilities of a user being located at various positions in the imaginary two-dimensional grid; and fusing the two-dimensional location estimate and the fourth uncertainty estimate with at least one of the context of the user location, the user floor location and the associated third uncertainty estimate, and a map information associated with the multi-floor building to determine a three-dimensional estimate of the user location.

* * * * *